United States Patent
Yoshino

(10) Patent No.: US 12,520,499 B2
(45) Date of Patent: Jan. 6, 2026

(54) MAGNETIC MEMORY DEVICE AND MANUFACTURING METHOD OF MAGNETIC MEMORY DEVICE

(71) Applicant: Kioxia Corporation, Tokyo (JP)

(72) Inventor: Kenichi Yoshino, Seongnam-si (KR)

(73) Assignee: Kioxia Corporation, Tokyo (JP)

( * ) Notice: Subject to any disclaimer, the term of this patent is extended or adjusted under 35 U.S.C. 154(b) by 909 days.

(21) Appl. No.: 17/472,414

(22) Filed: Sep. 10, 2021

(65) Prior Publication Data
US 2022/0302373 A1 Sep. 22, 2022

(30) Foreign Application Priority Data

Mar. 16, 2021 (JP) .................................. 2021-042396

(51) Int. Cl.
| | | |
|---|---|---|
| *H10B 61/00* | (2023.01) | |
| *G11C 11/16* | (2006.01) | |
| *H10N 50/01* | (2023.01) | |
| *H10N 50/10* | (2023.01) | |
| *H10N 50/85* | (2023.01) | |

(52) U.S. Cl.
CPC ............ *H10B 61/10* (2023.02); *G11C 11/161* (2013.01); *H10N 50/01* (2023.02); *H10N 50/10* (2023.02); *H10N 50/85* (2023.02); *G11C 11/1655* (2013.01); *G11C 11/1673* (2013.01); *G11C 11/1675* (2013.01)

(58) Field of Classification Search
CPC ....... G11C 11/161; H10N 50/10; H10B 61/10
See application file for complete search history.

(56) References Cited

U.S. PATENT DOCUMENTS

| | | |
|---|---|---|
| 6,929,957 B2 | 8/2005 | Min et al. |
| 7,306,954 B2 | 12/2007 | Nejad et al. |
| 7,507,253 B2 | 3/2009 | Nordquist |
| (Continued) | | |

FOREIGN PATENT DOCUMENTS

| | | |
|---|---|---|
| JP | 5177938 B2 | 9/2004 |
| JP | 5696909 B2 | 2/2015 |
| JP | 2021145025 A | 9/2021 |

OTHER PUBLICATIONS

U.S. Appl. No. 17/349,203, First Named Inventor: Naoki Akiyama; Title: "Magnetoresistance Memory Device and Method of Manufacturing Magnetoresistance Memory Device"; Filed: Jun. 16, 2021.

(Continued)

*Primary Examiner* — Vincent Wall
(74) *Attorney, Agent, or Firm* — Holtz, Holtz & Volek PC

(57) ABSTRACT

According to one embodiment, a magnetic memory device comprises a first conductor, a second conductor, a third conductor, a fourth conductor, a first layer stack, a second layer stack, and a third layer stack. The first layer stack, the second layer stack, and the third layer stack are arranged between the first conductor and the third conductor, between the first conductor and the fourth conductor, and between the second conductor and the third conductor, respectively. A height from a first portion to a first plane and a height from a second portion to the first plane are within a first range, the first portion being between the first layer stack and the third layer stack, and the second portion being between the second layer stack and the third layer stack.

11 Claims, 23 Drawing Sheets

(56) References Cited

U.S. PATENT DOCUMENTS

| | | | | |
|---|---|---|---|---|
| 8,023,315 | B2* | 9/2011 | Fukami | H01F 10/3254 |
| | | | | 365/158 |
| 8,912,013 | B2* | 12/2014 | Zhu | B82Y 10/00 |
| | | | | 365/158 |
| 8,995,181 | B2* | 3/2015 | Watanabe | H10N 50/80 |
| | | | | 365/158 |
| 9,461,240 | B2* | 10/2016 | Sawada | H10N 50/10 |
| 9,608,039 | B1 | 3/2017 | Apalkov et al. | |
| 9,947,862 | B2* | 4/2018 | Watanabe | H10N 50/85 |
| 10,026,888 | B2* | 7/2018 | Ochiai | H10N 50/10 |
| 10,170,519 | B2* | 1/2019 | Eeh | G11C 11/161 |
| 10,263,178 | B2 | 4/2019 | Sawada et al. | |
| 10,388,343 | B2 | 8/2019 | Oikawa et al. | |
| 10,468,170 | B2 | 11/2019 | Eeh et al. | |
| 10,840,434 | B2 | 11/2020 | Kitagawa et al. | |
| 10,873,021 | B2 | 12/2020 | Eeh et al. | |
| 11,127,445 | B2 | 9/2021 | Eeh et al. | |
| 2014/0284534 | A1* | 9/2014 | Nagase | H10N 50/85 |
| | | | | 257/1 |
| 2014/0319634 | A1* | 10/2014 | Shukh | G11C 11/161 |
| | | | | 257/427 |
| 2015/0069554 | A1* | 3/2015 | Nakayama | H10N 50/10 |
| | | | | 257/421 |
| 2016/0118442 | A1* | 4/2016 | Kim | H10B 63/20 |
| | | | | 711/147 |
| 2016/0130693 | A1* | 5/2016 | Sawada | C23C 14/541 |
| | | | | 204/192.25 |
| 2016/0190437 | A1* | 6/2016 | Hu | H10N 50/01 |
| | | | | 438/3 |
| 2016/0301000 | A1* | 10/2016 | Kim | H10N 50/80 |
| 2017/0263680 | A1* | 9/2017 | Yoshino | H10N 50/01 |
| 2017/0263858 | A1* | 9/2017 | Sonoda | H10N 70/8265 |
| 2018/0019281 | A1* | 1/2018 | Lee | H10N 70/20 |
| 2018/0076262 | A1 | 3/2018 | Eeh et al. | |
| 2018/0277745 | A1 | 9/2018 | Oikawa et al. | |
| 2018/0366642 | A1* | 12/2018 | Yang | G11C 11/161 |
| 2019/0019841 | A1 | 1/2019 | Eeh et al. | |
| 2019/0096461 | A1* | 3/2019 | Koike | G11C 11/161 |
| 2019/0287592 | A1* | 9/2019 | Matsunami | G11C 11/161 |
| 2020/0083285 | A1 | 3/2020 | Nagase et al. | |
| 2020/0294567 | A1* | 9/2020 | Oikawa | H10N 50/85 |
| 2020/0302987 | A1 | 9/2020 | Sawada et al. | |
| 2021/0074908 | A1 | 3/2021 | Oikawa et al. | |
| 2021/0074911 | A1 | 3/2021 | Isoda et al. | |
| 2021/0083170 | A1 | 3/2021 | Sawada et al. | |
| 2021/0288243 | A1 | 9/2021 | Ochiai et al. | |

OTHER PUBLICATIONS

U.S. Appl. No. 17/199,593, First Named Inventor: Kenichi Yoshino; Title: "Magnetic Memory Device and Method for Manufacturing the Same"; Filed: Mar. 12, 2021.

U.S. Appl. No. 17/471,327, First Named Inventor: Takao Ochiai; Title: "Magnetoresistance Memory Device and Method of Manufacturing Magnetoresistance Memory Device"; Filed: Sep. 10, 2021.

U.S. Appl. No. 17/472,395, First Named Inventor: Naoki Akiyama; Title: "Magnetoresistance Memory Device and Method of Manufacturing Magnetoresistance Memory Device"; Filed: Sep. 10, 2021.

* cited by examiner

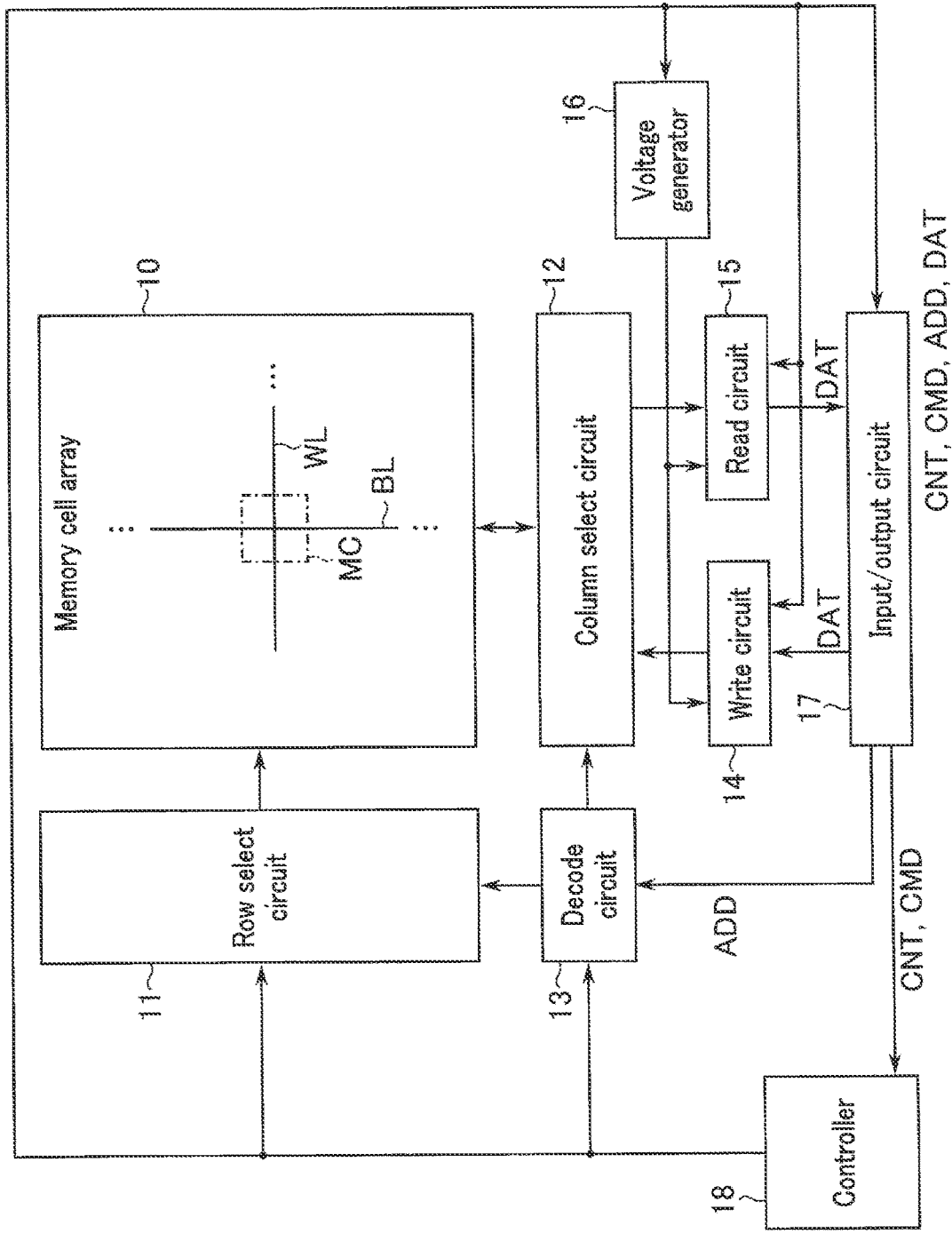
F I G. 1

F.I.G. 4

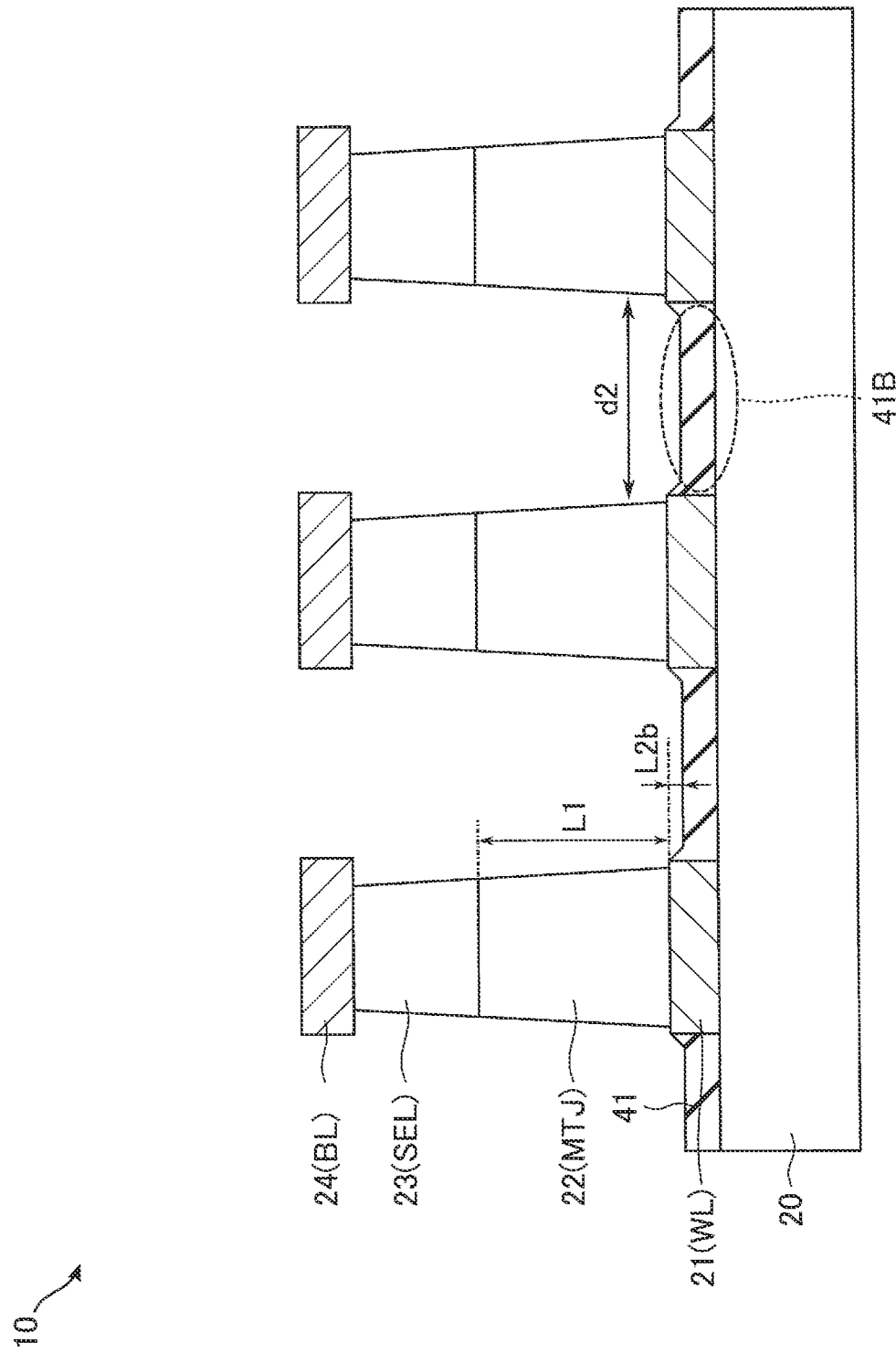
F I G. 5

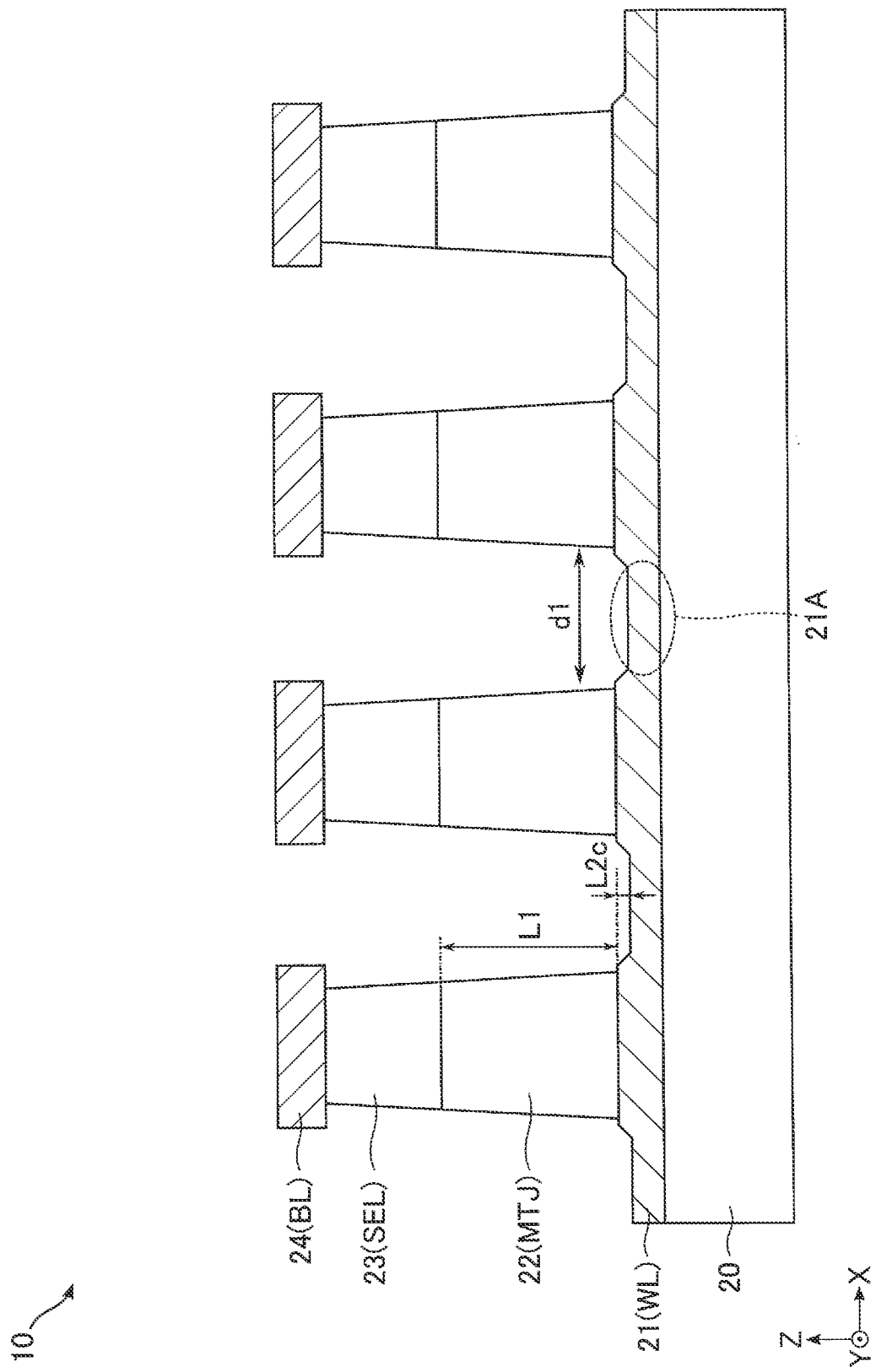
F I G. 6

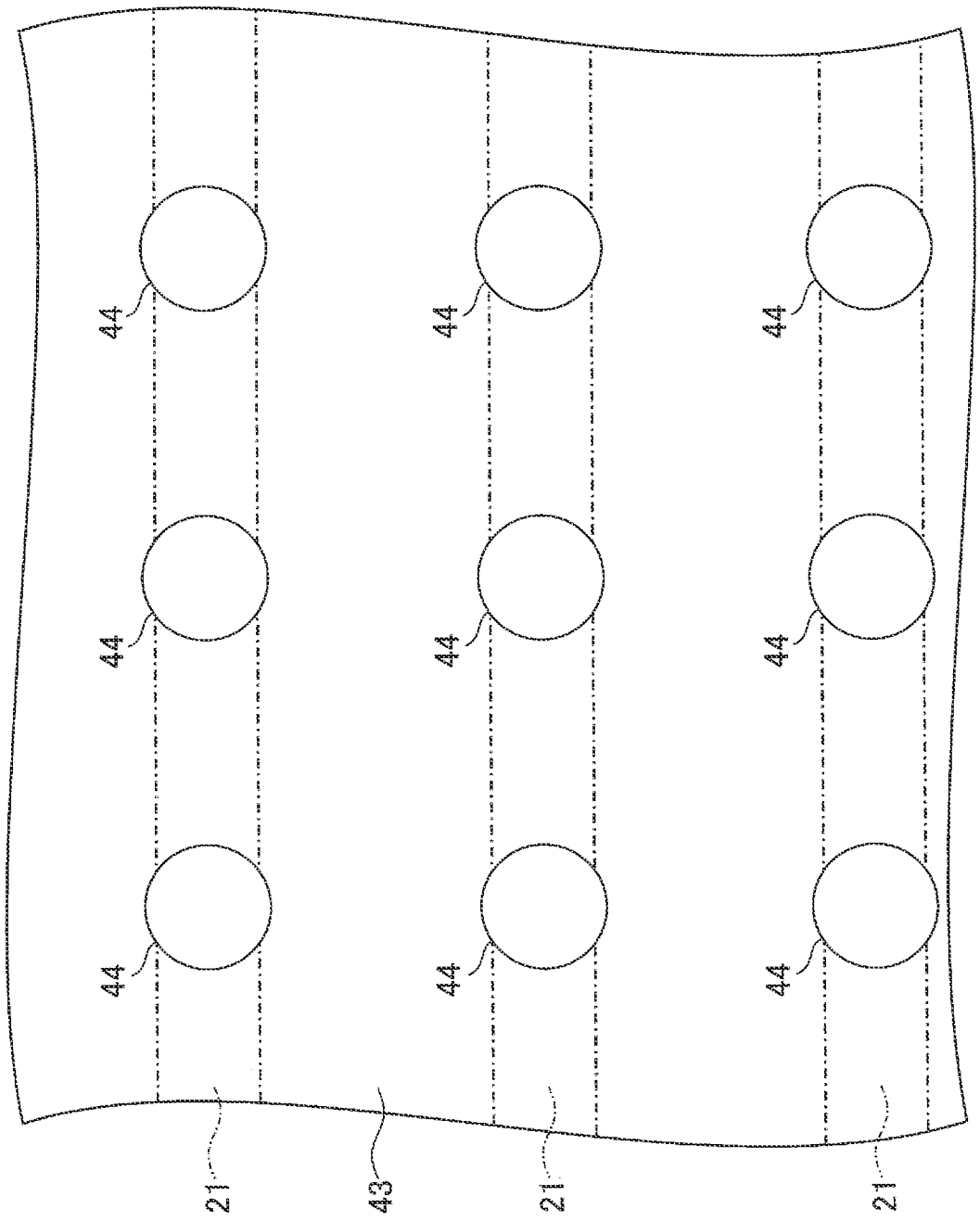
F I G. 12

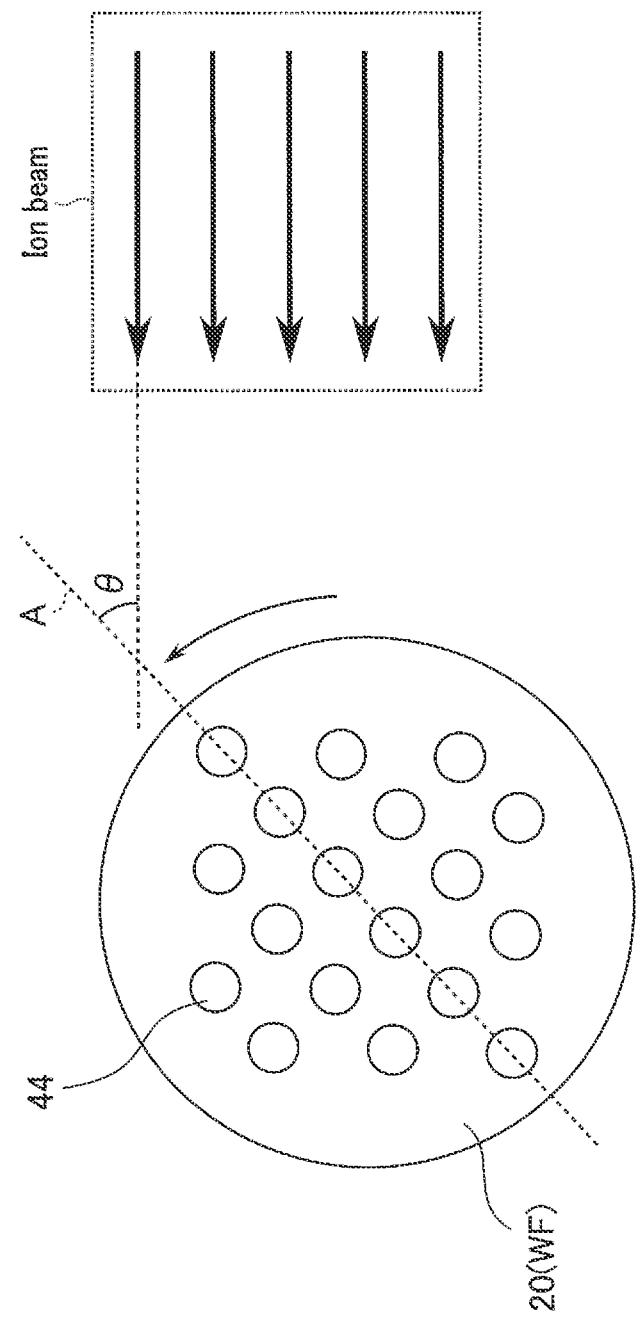
F I G. 14

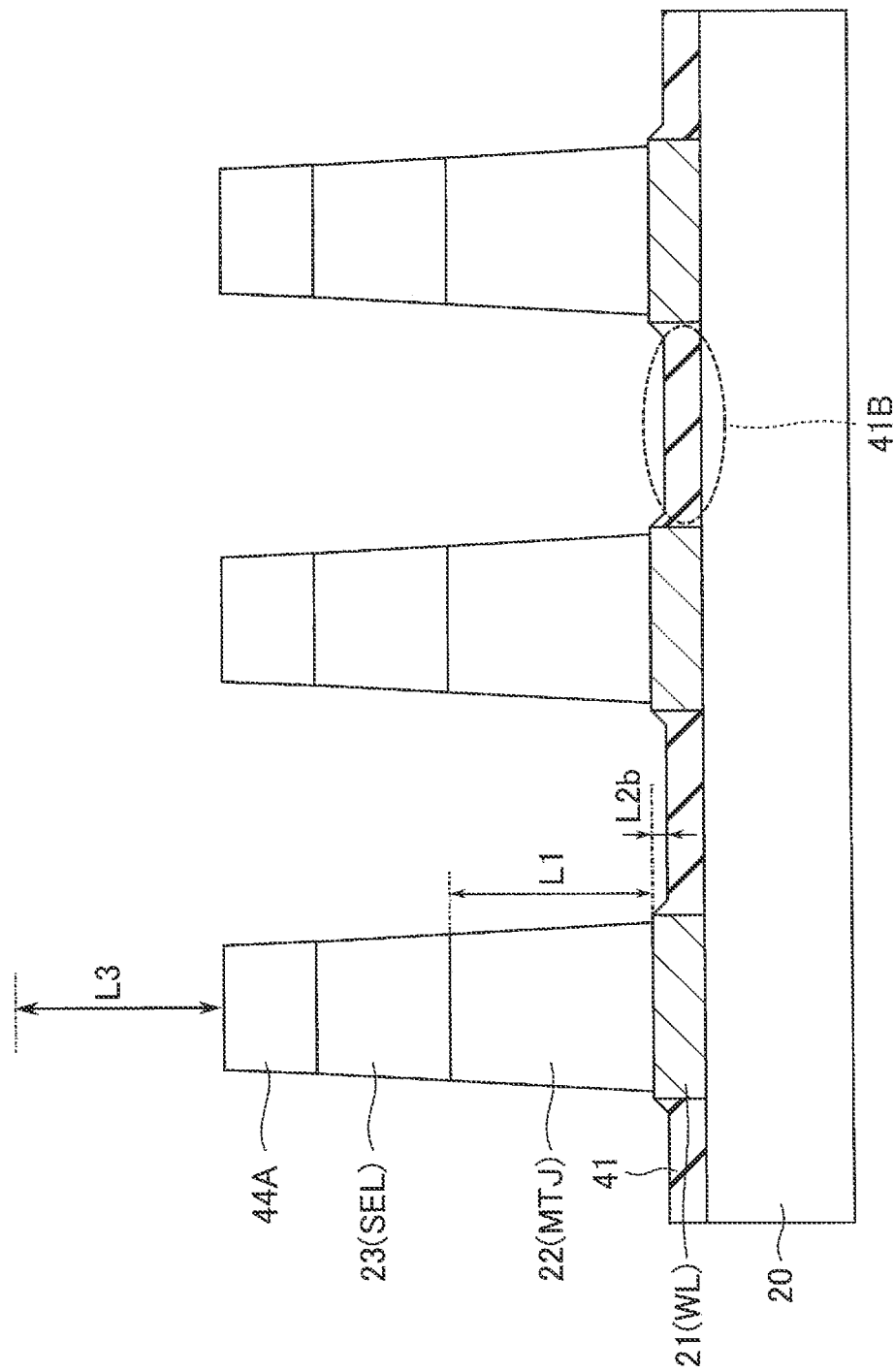
F I G. 17

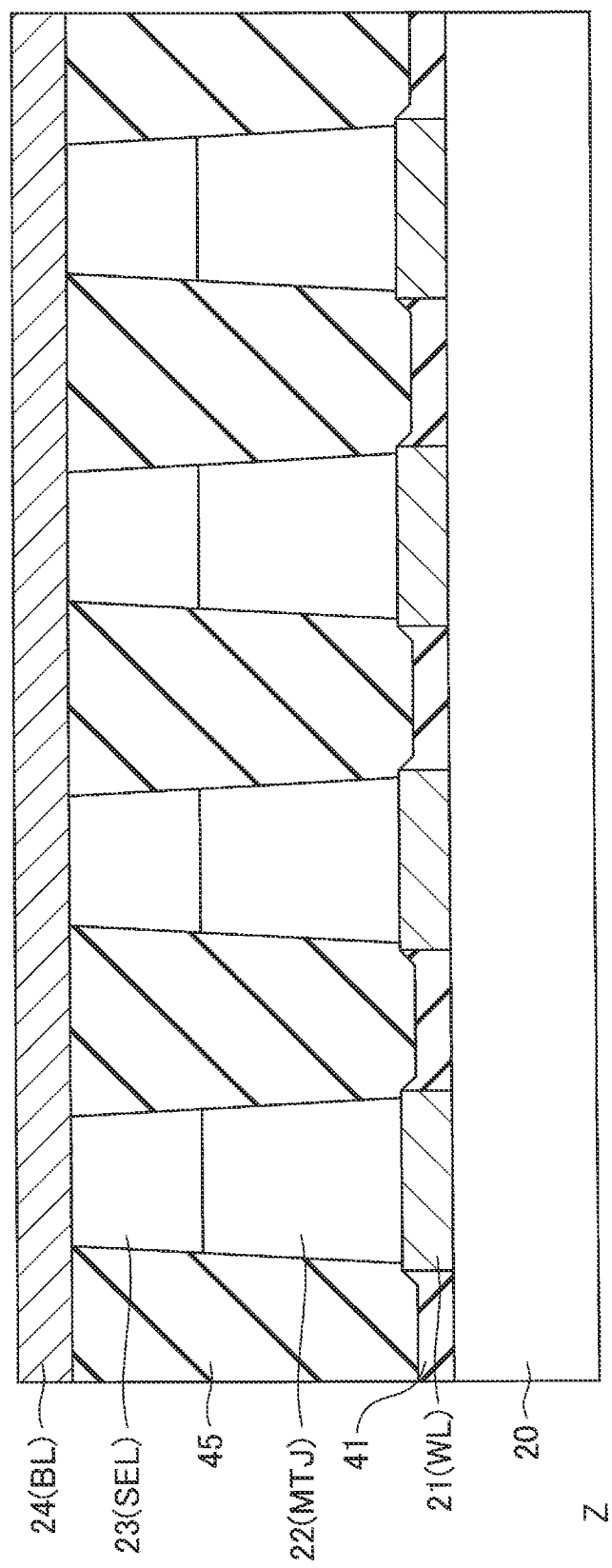
F I G. 20

MAGNETIC MEMORY DEVICE AND MANUFACTURING METHOD OF MAGNETIC MEMORY DEVICE

CROSS-REFERENCE TO RELATED APPLICATIONS

This application is based upon and claims the benefit of priority from Japanese Patent Application No. 2021-042396, filed Mar. 16, 2021, the entire contents of which are incorporated herein by reference.

FIELD

Embodiments described herein relate generally to a magnetic memory device and a manufacturing method of the magnetic memory device.

BACKGROUND

A magnetic memory device adopting a magnetoresistive effect element as a memory element (magnetoresistive random access memory or MRAM) has been known.

BRIEF DESCRIPTION OF THE DRAWINGS

FIG. 1 is a block diagram showing the configuration of a magnetic memory device according to one embodiment.

FIG. 5 is a cross-sectional view showing the configuration of the memory cell array in the magnetic memory device according to the embodiment.

FIG. 6 is a cross-sectional view showing the configuration of the memory cell array in the magnetic memory device according to the embodiment.

FIG. 12 is a plan view explaining the method for manufacturing the memory cell array of the magnetic memory device according to the embodiment.

FIG. 14 is a schematic diagram explaining the method for manufacturing the memory cell array of the magnetic memory device according to the embodiment.

FIG. 17 is a cross-sectional view explaining the method for manufacturing the memory cell array of the magnetic memory device according to the embodiment.

FIG. 20 is a cross-sectional view explaining the method for manufacturing the memory cell array of the magnetic memory device according to the embodiment.

DETAILED DESCRIPTION

Figure 2:
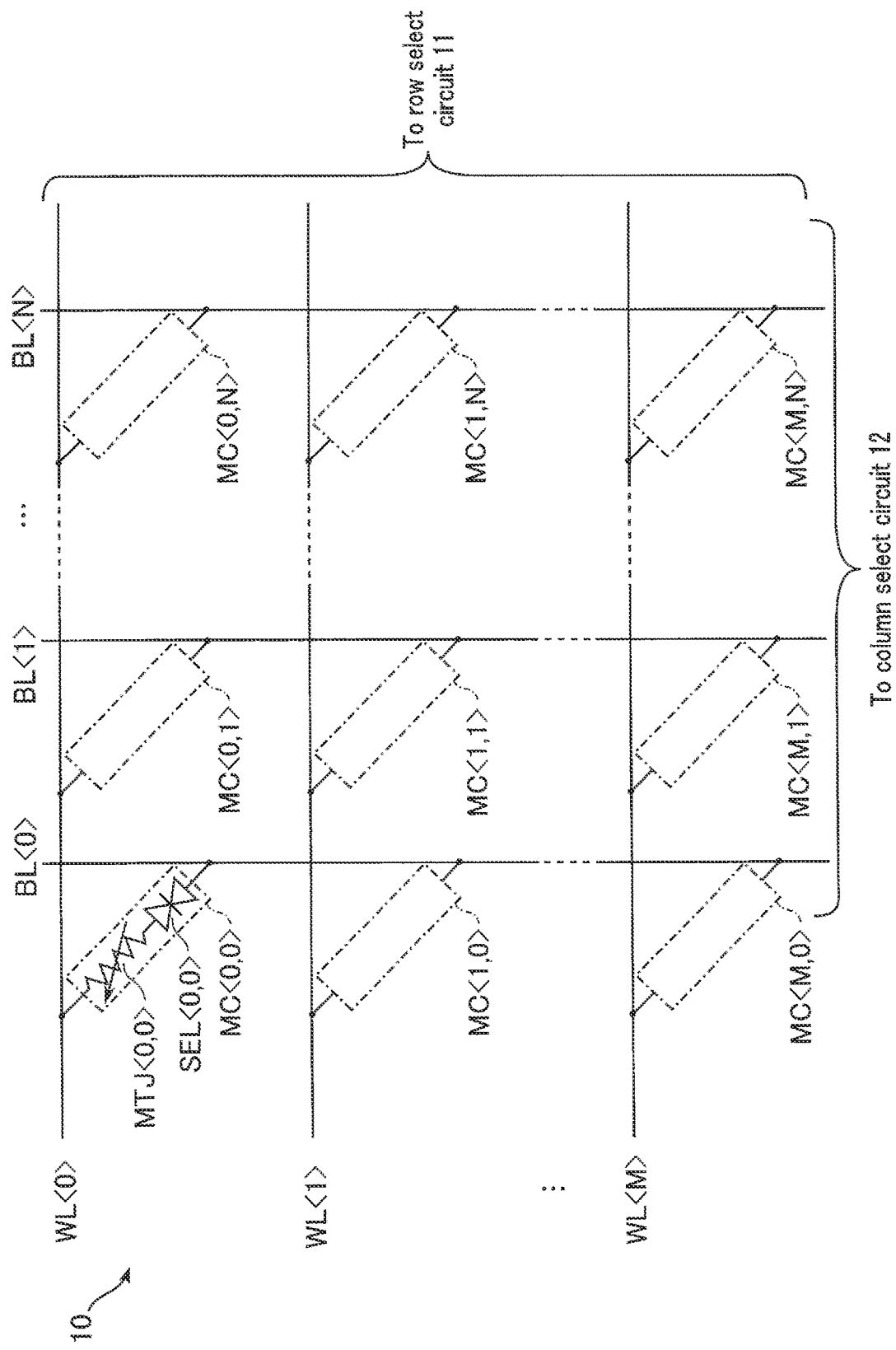
FIG. 2 is a circuit diagram showing the configuration of a memory cell array in the magnetic memory device according to the embodiment.

In general, according to one embodiment, a magnetic memory device comprising, a first conductor and a second conductor extending in a first direction, separated from each other, and aligned in a second direction that intersects the first direction, a third conductor and a fourth conductor extending in the second direction, arranged above the first conductor and the second conductor, separated from each other, and aligned in the first direction, a first layer stack arranged between the first conductor and the third conductor, and including a first magnetoresistive effect element, a second layer stack arranged between the first conductor and the fourth conductor, and including a second magnetoresistive effect element, a third layer stack arranged between the second conductor and the third conductor, and including a third magnetoresistive effect element, and an insulator arranged between the first conductor and the second conductor underneath the first layer stack, the second layer stack, and the third layer stack. A cross-sectional shape of the first layer stack is circular when viewed from a third direction that intersects the first direction and the second direction, a cross-sectional shape of the second layer stack is circular when viewed from the third direction, a cross-sectional shape of the third layer stack is circular when viewed from the third direction, a top surface of the first layer stack, a top surface of the second layer stack, and a top surface of the third layer stack are on a first plane including the first direction and the second direction, each of a height of the insulator from a top surface of a first portion to the first plane and a height of the insulator from a top surface of a second portion to the first plane is in a range of 90 percent or larger and 110 percent or smaller of a first height, the first portion being between the first layer stack and the third layer stack, and the second portion being between the second layer stack and the third layer stack, and the first height is an average of a height of the top surface of the first portion and a height of the top surface of the second portion.

The embodiments of the present invention will be explained with reference to the drawings. In the following explanation, components having the same functions and configurations will be referred to by the same reference symbols. If structural components having the same reference symbols need to be distinguished from each other, letters or numerals may be added to the symbols. If the structural components do not particularly need to be distinguished from each other, only the common symbols are used without adding letters or numerals thereto. The additional letters or numerals are not limited to a superscript or subscript, but may be lowercase letters and indices indicating the arrangement order attached to the end of a reference symbol.

1. Embodiment

A magnetic memory device according to the present embodiment will be explained. Examples of the magnetic memory device according to the present embodiment include a perpendicular-magnetization type magnetic memory device, which adopts elements having a magnetoresistance effect in a magnetic tunnel junction (MTJ) (which may also be referred to as "magnetoresistance effect elements" or "MTJ elements") as variable resistance elements.

1.1 Configuration

First, the configuration of the magnetic memory device according to the present embodiment will be explained.

1.1.1 Configuration of Magnetic Memory Device

FIG. 1 is a block diagram showing the configuration of the magnetic memory device according to the embodiment. A magnetic memory device 1 includes, as illustrated in FIG. 1, a memory cell array 10, a row select circuit 11, a column select circuit 12, a decode circuit 13, a write circuit 14, a read circuit 15, a voltage generator 16, an input/output circuit 17, and a controller 18.

The memory cell array 10 includes a plurality of memory cells MC, each of which is associated with a pair of a row and a column. In particular, the memory cells MC of the same row are coupled to the same word line WL, and the memory cells MC of the same column are coupled to the same bit line BL.

The row select circuit 11 is coupled to the memory cell array 10 by way of the word lines WL. The row select circuit 11 receives decoding results (a row address) of an address ADD from the decode circuit 13. The row select circuit 11 sets a word line WL corresponding to the row indicated by the decoding results of the address ADD to a selected state. Hereinafter, a word line WL that is set to a selected state will be referred to as a selected word line WL. Word lines WL other than the selected word line WL will be referred to as non-selected word lines WL.

The column select circuit 12 is coupled to the memory cell array 10 by way of the bit lines BL. The column select circuit 12 receives decoding results (a column address) of the address ADD from the decode circuit 13. The column select circuit 12 sets a bit line BL corresponding to the column indicated by the decoding results of the address ADD to a selected state. Hereinafter, a bit line BL that is set to a selected state will be referred to as a selected bit line BL. Bit lines BL other than the selected bit line BL will be referred to as non-selected bit lines BL.

The decode circuit 13 decodes the address ADD received from the input/output circuit 17. The decode circuit 13 supplies the decoding results of the address ADD to the row select circuit 11 and column select circuit 12. The address ADD includes addresses of a column and row that are to be selected.

The write circuit 14 writes data into memory cells MC. The write circuit 14 includes, for example, a write driver (not shown).

The read circuit 15 reads data from memory cells MC. The read circuit 15 may include a sense amplifier (not shown).

The voltage generator 16 generates voltages for the operations of the memory cell array 10 using a source voltage supplied from the outside (not shown) of the magnetic memory device 1. For example, the voltage generator 16 generates voltages required for a write operation and outputs them to the write circuit 14. The voltage generator 16 also generates voltages required for a read operation and outputs them to the read circuit 15.

The input/output circuit 17 transfers an address ADD received from the outside of the magnetic memory device 1 to the decode circuit 13. The input/output circuit 17 also transfers a command CMD received from the outside of the magnetic memory device 1 to the controller 18. The input/output circuit 17 transmits and receives various control signals CNT between the outside of the magnetic memory device 1 and the controller 18. The input/output circuit 17 transfers to the write circuit 14 the data DAT received from the outside of the magnetic memory device 1, and outputs to the outside of the magnetic memory device 1 the data DAT transferred from the read circuit 15.

The controller 18 controls, in accordance with control signals CNT and commands CMD, the operations of the row select circuit 11, column select circuit 12, decode circuit 13, write circuit 14, read circuit 15, voltage generator 16, and input/output circuit 17 of the magnetic memory device 1.

1.1.2 Configuration of Memory Cell Array

Next, the configuration of a memory cell array in the magnetic memory device according to the present embodiment will be explained with reference to FIG. 2, which is a circuit diagram showing the configuration of a memory cell array in the magnetic memory device according to the present embodiment. In FIG. 2, the word lines WL are distinguished by subscripts enclosed in indices "< >".

As illustrated in FIG. 2, the memory cells MC are arranged in a matrix in the memory cell array 10, and each one of the memory cells MC is associated with a pair of one of the bit lines BL (BL<0>, BL<1>, . . . , BL<N>) and one of the word lines WL (WL<0>, WL<1>, . . . , WL<M>) (where M and N are natural numbers larger than or equal to 2). In other words, the memory cell MC<i,j> ($0 \leq i \leq M$, $0 \leq j \leq N$) is coupled between the word line WL<i> and bit line BL<j>.

The memory cell MC<i,j> includes a switching element SEL<i,j> and a magnetoresistive effect element MTJ<i,j> that are coupled in series with each other.

A switching element SEL is provided with a switching function that controls the supply of a current to the corresponding magnetoresistive effect element MTJ at the time of writing and reading data to and from the magnetoresistive effect element MTJ. In particular, the switching element SEL of a memory cell MC serves as an insulator having a large resistance value and interrupts the current (entering an OFF state) when the voltage applied to this memory cell MC is lower than a threshold voltage Vth. When the voltage is higher than or equal to the threshold voltage Vth, the switching element SEL serves as a conductor having a small resistance value and allows the current to flow (entering an ON state). That is, the switching element SEL is provided with a function of switching between interrupting and passing of the current in accordance with the voltage applied to the memory cell MC, regardless of the direction of the current flow.

The switching element SEL may be a two-terminal switching element. When the voltage applied between the two terminals is lower than the threshold voltage, this switching element is in a "high resistance" state, for example an electrically non-conductive state. When the voltage applied between the two terminals is higher than or equal to the threshold voltage, the switching element is in a "low resistance" state, for example an electrically conductive state. The switching element may have this function, regardless of the polarity of the voltage.

With the current controlled by the switching element SEL, the state of the magnetoresistive effect element MTJ can be switched between the low resistance state and high resistance state. The magnetoresistive effect element MTJ functions as a memory element designed to write data, hold the written data in a non-volatile manner, and read the data, in accordance with the changes of the resistance state of the element.

Figure 3:
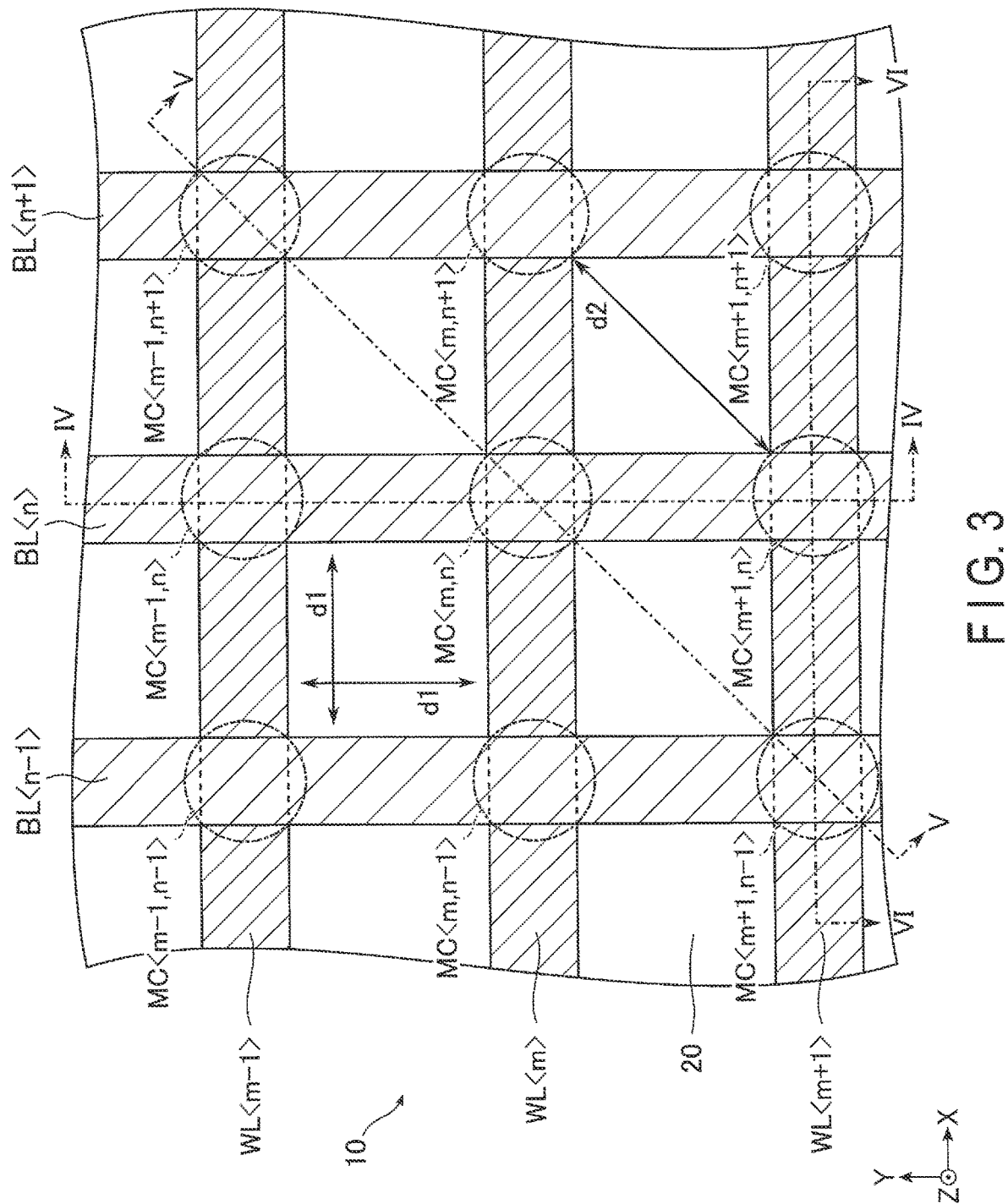
FIG. 3 is a plan view showing the configuration of the memory cell array in the magnetic memory device according to the embodiment.

The shape of a memory cell MC and arrangement of memory cells MC with respect to the bit lines BL and word lines WL in the memory cell array 10 will be explained with reference to FIG. 3, which shows a plan view of an exemplary configuration of the memory cell array in the magnetic memory device according to the present embodiment. FIG. 3 illustrates multiple memory cells MC of the memory cell array 10 arranged between three word lines WL<m−1>, WL<m>, and WL<m+1> and three bit lines BL<n−1>, BL<n>, and BL<n+1> (where 1≤m≤M−1, 1≤n≤N−1). For the sake of convenience, interlayer insulating films are omitted from FIG. 3.

As illustrated in FIG. 3, the memory cell array 10 is arranged above the semiconductor substrate 20. In the following explanation, a plane parallel to the surface of the semiconductor substrate 20 will be referred to as an "XY plane", and the axis perpendicular to the XY plane will be referred to as a "Z-axis". The direction approaching the semiconductor substrate 20 along the Z-axis will be regarded as a "downward" direction, while the direction moving away from the semiconductor substrate 20 will be regarded as an "upward" direction. A pair of axes on the XY plane orthogonal to each other will be referred to as an "X-axis" and "Y-axis".

The memory cells MC are arranged between the word lines WL and bit lines BL. In the example of FIG. 3, the word lines WL are arranged beneath the memory cells MC, and the bit lines BL are arranged above the memory cells MC. This is not a limitation, however. The positional relationship of the word lines WL and bit lines BL may be the other way around.

Each of the memory cells MC has a circular shape along the XY cross section (i.e., the outer diameter of the memory cell MC is approximately the same regardless of the direction on the XY cross section).

The word lines WL extend along the X-axis and are aligned in the direction of the Y-axis. The bit lines BL extend along the Y-axis and are aligned in the direction of the X-axis. The word lines WL and bit lines BL are arranged in such a manner that the distance between any two adjacent word lines WL is approximately equal to the distance between any two adjacent bit lines BL. A memory cell MC is arranged at an intersecting portion of a bit line BL and a word line WL. Thus, the length d1 of the distance between two adjacent memory cells MC (e.g., memory cells MC<m, n> and MC<m, n−1>, or memory cells MC<m, n> and MC<m−1, n>) in contact with the same bit line BL or the same word line WL is shorter than the length d2 of the distance between any two diagonally adjacent memory cells MC (e.g., memory cells MC<m+1, n> and MC<m, n+1>).

Figure 4:
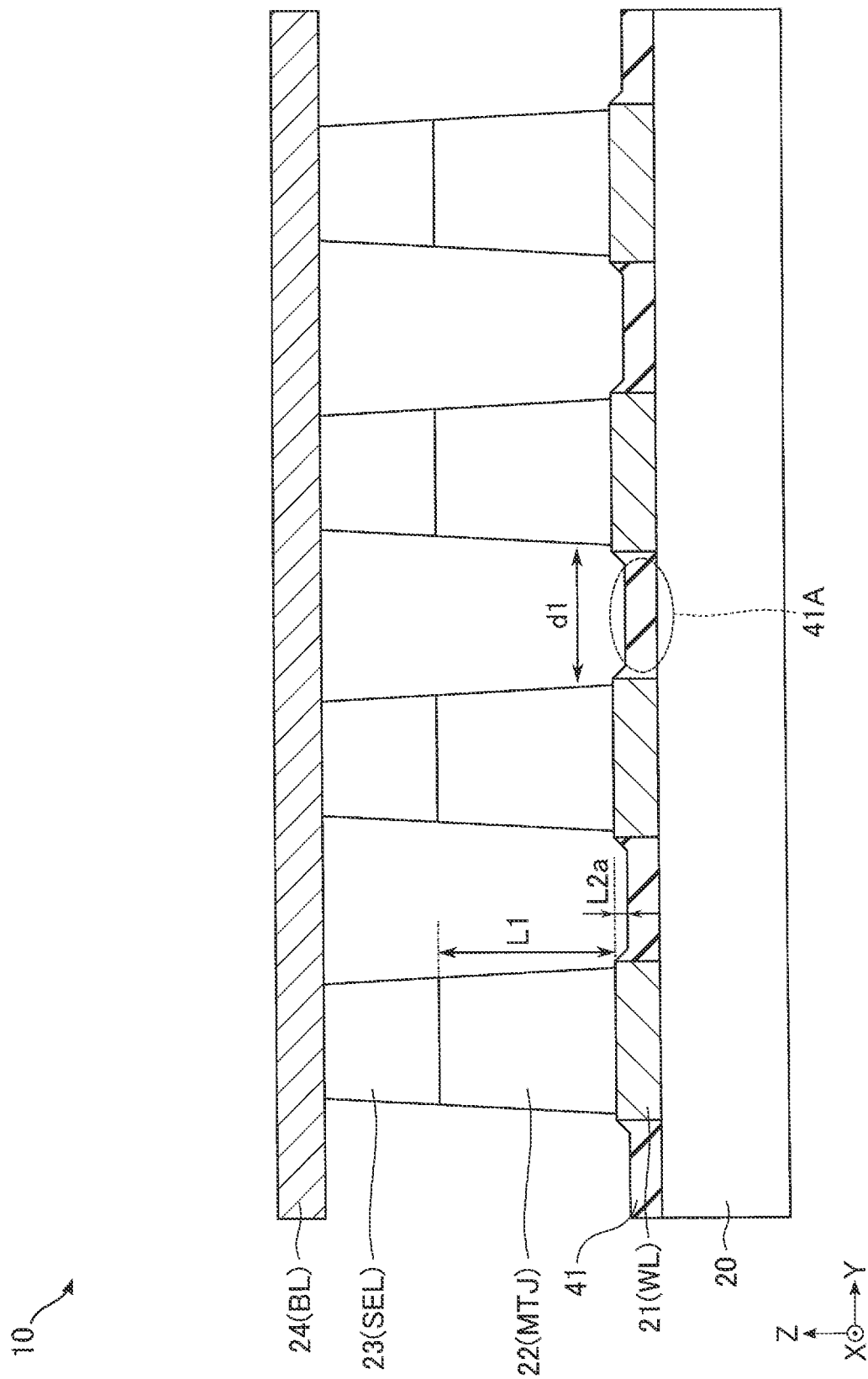
FIG. 4 is a cross-sectional view showing the configuration of the memory cell array in the magnetic memory device according to the embodiment.

Next, the cross-sectional configuration of the memory cell array 10 will be explained with reference to FIGS. 4, 5, and 6, which show cross-sectional views of an exemplary configuration of a memory cell array of the magnetic memory device according to the present embodiment. FIGS. 4, 5, and 6 show cross-sectional views of the structure of FIG. 3, taken along lines IV-IV, V-V, and VI-VI, respectively.

As illustrated in FIGS. 4, 5, and 6, the memory cell array 10 is arranged above the semiconductor substrate 20.

A plurality of conductors 21 are arranged on the top surface of the semiconductor substrate 20. The conductors 21 extend along the X-axis, and are aligned in the direction of the Y-axis. The conductors 21 are conductive, and function as respective word lines WL. An insulator 41 is provided between any two adjacent conductors 21. In this manner, the conductors 21 are insulated from each other. The conductors 21 in FIGS. 4, 5, and 6 are arranged on the semiconductor substrate 20, but the arrangement is not limited thereto. For instance, the conductors 21 may not be arranged in contact with the semiconductor substrate 20, and may be apart from the semiconductor substrate 20.

A plurality of elements 22, each of which functions as a magnetoresistive effect element MTJ, are arranged on the top surface of a conductor 21. An element 22 has a height L1 along the Z-axis, tapered with its XY plane cross-sectional area gradually decreasing in the upward direction. The elements 22 arranged on the top surface of the conductor 21 may be aligned, for example in the direction of the X-axis. In other words, the elements 22 are arranged along the X-axis on the top surface of one conductor 21 and commonly coupled to the conductor 21. The configuration of an element 22 will be discussed later in detail.

The top surface of a portion 41A of the insulator 41 between two adjacent elements 22 in the cross section of FIG. 4 is positioned lower by an amount L2a than the bottom surface of the elements 22. The height of the top surface of the portion 41A scarcely changes, irrespective of a distance from the elements 22.

Furthermore, the top surface of a portion 41B of the insulator 41 between two adjacent elements 22 in the cross section of FIG. 5 is positioned lower by an amount L2b than the bottom surface of the elements 22. In the same manner as the top surface of the portion 41A, the height of the top surface of the portion 41B scarcely changes, irrespective of the distance from the elements 22.

Moreover, the top surface of a portion 21A of the conductors 21 between two adjacent elements 22 in the cross section of FIG. 6 is positioned lower by an amount L2c than the bottom surface of the elements 22. In the same manner as the top surfaces of the portions 41A and 41B, the height of the top surface of the portion 21A scarcely changes, irrespective of the distance from the elements 22.

An element 23 is arranged on the top surface of each of the elements 22 to serve as a switching element SEL. In the same manner as the element 22, the element 23 is tapered with its XY plane cross-sectional area gradually decreasing in the upward direction. The top surface of each of the elements 23 is coupled to one of the conductors 24.

A plurality of conductors 24 extend along the Y-axis, and are aligned in the direction of the X-axis. The conductors 24 are conductive, and respectively serve as bit lines BL. A plurality of elements 23 aligned in the direction of the Y-axis are commonly coupled to one conductor 24. In FIGS. 4, 5, and 6, the elements 23 are arranged on the elements 22 and on the conductors 24, but the arrangement is not limited thereto. For instance, the elements 23 may be coupled to the elements 22 and to the conductors 24 with conductive contact plugs (not shown) interposed between.

In the above configuration of the memory cell array 10, the lengths of L2a, L2b, and L2c can be regarded as approximately equal to each other. In other words, the top surface of the portion 41A of the insulator 41, the top surface of the portion 41B of the insulator 41, and the top surface of the portion 21A of the conductor 21 can be regarded to be approximately at the same height. In particular, the ratio of the height (L1+L2a) to the predefined reference height Lref is, for example, 0.9 or larger and 1.1 or smaller (0.9≤(L1+L2a)/Lref≤1.1). The ratio of the height (L1+L2b) to the reference height Lref is 0.9 or larger and 1.1 or smaller (0.9≤(L1+L2b)/Lref≤1.1). The ratio of the height (L1+L2c) to the reference height Lref is 0.9 or larger and 1.1 or smaller (0.9≤(L1+L2c)/Lref≤1.1). The reference height Lref may be an average of the heights (L1+L2a), (L1+L2b), and (L1+L2c), which is (L1+(L2a+L2b+L2c)/3). The reference height Lref is not limited thereto, however. The average height may be calculated from the heights between the top surface of the elements 22 and the respective top surfaces of four or more portions selected from the portions 41A, portions 41B, and portions 21A in such a manner as to include at least one portion 41A, at least one portion 41B, and at least one portion 21A.

Hereinafter, the ratio of the distance between two adjacent elements 22 aligned in the X-axis or Y-axis direction to the height of the element 22 may be referred to as an aspect ratio AR. In the example of FIGS. 3 to 6, the aspect ratio AR of the memory cell array 10 is defined as AR=L1/d1, where the length d1 denotes a distance between two adjacent elements aligned in the X-axis or Y-axis direction. The aspect ratio AR is preferably set to be 1 or larger. Still more preferably, the ratio is set to be approximately 1.5, or to be larger than or equal to 1.5. The length d1 is preferably set to 50 nanometers (nm) or smaller.

1.1.3 Magnetoresistive Effect Element

The configuration of a magnetoresistive effect element of the magnetic memory device according to the present embodiment will be explained with reference to FIG. 7, which shows a cross-sectional view of the configuration of a magnetoresistive effect element of the magnetic memory device according to the present embodiment. In (A) of FIG. 7, an exemplary cross section of the tunnel barrier layer TB in a magnetoresistive effect element MTJ taken along the XY plane is illustrated. In (B) of FIG. 7, an exemplary cross section of the magnetoresistive effect element MTJ of FIGS. 4, 5, and 6 taken along a plane (e.g., XZ plane) perpendicular to the Z-axis is illustrated.

First, the cross section of the magnetoresistive effect element MTJ along the XY plane will be described with reference to (A) of FIG. 7.

Figure 7:
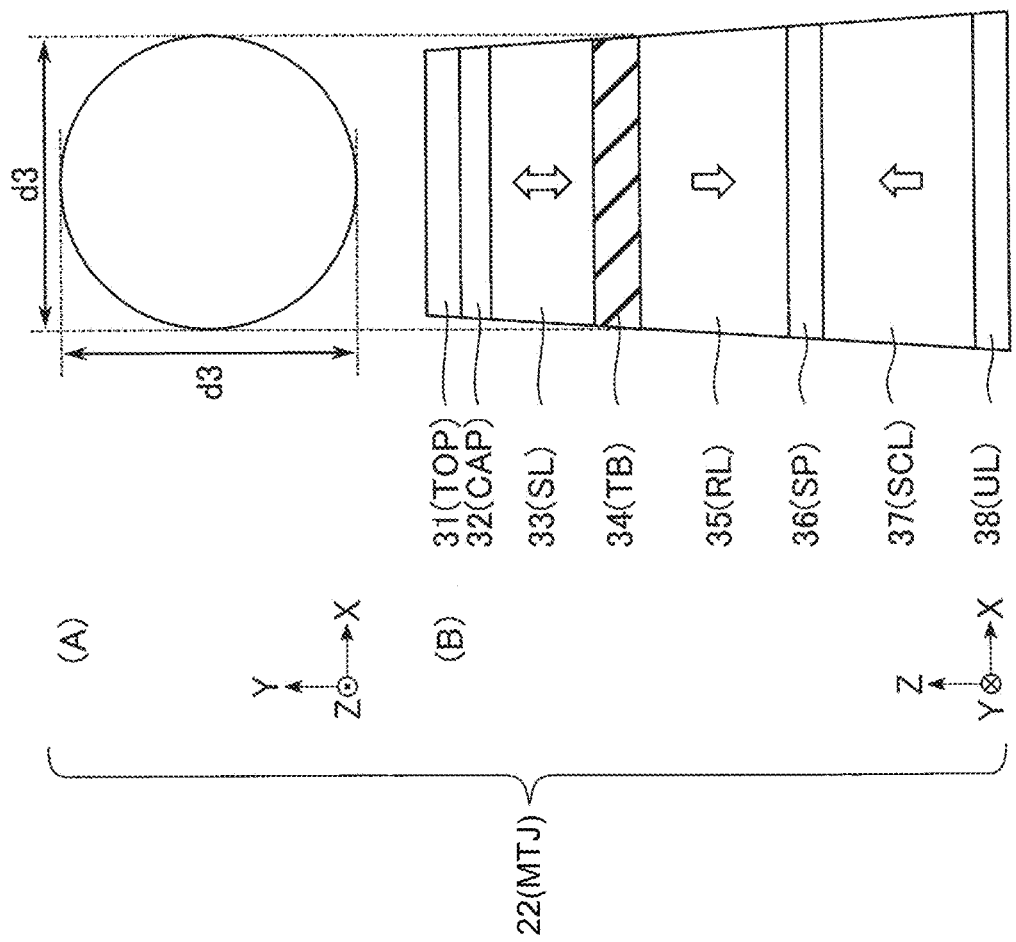
FIG. 7 is a cross-sectional view showing the configuration of a magnetoresistive effect element in the magnetic memory device according to the embodiment.

The magnetoresistive effect element MTJ is shaped, when viewed from above, into a circle having an outer diameter of d3 (the outer diameter of the magnetoresistive effect element MTJ being approximately the same regardless of the direction on the XY plane), as illustrated in (A) of FIG. 7. The example in (A) of FIG. 7 shows a cross section of the tunnel barrier layer TB taken along the XY plane. The overview of other layers in the magnetoresistive effect element MTJ is approximately the same as (A) of FIG. 7, except for differences in size due to tapering along the Z-axis.

The length d3 is preferably set to be 20 nanometers or smaller. In addition, it is preferable that this numerical range for the length d3 (e.g., d3≤20 nanometers) and the aforementioned numerical range for the length d1 (e.g., d1≤50 nanometers) be satisfied at the same time.

Next, the cross section of the magnetoresistive effect element MTJ along the Z-axis will be described with reference to (B) of FIG. 7.

The magnetoresistive effect element MTJ includes, for example, a nonmagnet 31 serving as a top layer TOP, a nonmagnet 32 serving as a capping layer CAP, a ferromagnet 33 serving as a storage layer SL, a nonmagnet 34 serving as a tunnel barrier layer TB, a ferromagnet 35 serving as a reference layer RL, a nonmagnet 36 serving as a spacer layer SP, a ferromagnet 37 serving as a shift cancelling layer SCL, and a nonmagnet 38 serving as an under layer UL.

The magnetoresistive effect element MTJ has a multi-layered structure in which the nonmagnet 38, ferromagnet 37, nonmagnet 36, ferromagnet 35, nonmagnet 34, ferromagnet 33, nonmagnet 32, and nonmagnet 31 are stacked in this order from the word line WL side to the bit line BL side (in the Z-axis direction). The magnetoresistive effect element MTJ may function as a perpendicular magnetic MTJ element, in which the direction of the magnetization of the magnets that constitute the magnetoresistive effect element MTJ is perpendicular to the film surface. The magnetoresistive effect element MTJ may include a layer that is not shown in this drawing, between any two adjacent layers of the layers 31 to 38.

The nonmagnet 31 is a non-magnetic conductor. The nonmagnet 31 serves as a top electrode that enhances the electric connectivity between the upper end of the magnetoresistive effect element MTJ and the bit line BL or word line WL. The nonmagnet 31 may contain at least one element or compound selected from tungsten (W), tantalum (Ta), tantalum nitride (TaN), titanium (Ti) and titanium nitride (TiN).

The nonmagnet 32 is a non-magnetic conductive layer. The nonmagnet 32 has a function of suppressing an increase of the damping constant of the ferromagnet 33 and reducing the write current. The nonmagnet 32 may contain at least one nitride or oxide selected from magnesium oxide (MgO), magnesium nitride (MgN), zirconium nitride (ZrN), niobium nitride (NbN), silicon nitride (SiN), aluminum nitride (AlN), hafnium nitride (HfN), tantalum nitride (TaN), tungsten nitride (WN), chromium nitride (CrN), molybdenum nitride (MoN), titanium nitride (TiN) and vanadium nitride (VN). The nonmagnet 32 may be a mixture of any of these nitrides and oxides. That is, the nonmagnet 32 is not limited to a binary compound containing two types of elements, and may be a ternary compound containing three types of elements such as titanium aluminum nitride (AlTiN).

The ferromagnet 33 displays ferromagnetism. The direction of the easy axis of magnetization of the ferromagnet 33 is perpendicular to the film surface. The ferromagnet 33 therefore has a magnetization direction along the Z-axis, toward either the bit line BL side or the word line WL side. The ferromagnet 33 contains at least one of iron (Fe), cobalt (Co), and nickel (Ni), and further contains boron (B). In particular, the ferromagnet 33 may contain iron cobalt boron (FeCoB) or iron boride (FeB), with a body-centered cubic lattice structure.

The nonmagnet 34 is a non-magnetic insulator, which may contain, for example, magnesium oxide (MgO), and may further contain boron (B). The nonmagnet 34 has a NaCl crystalline structure in which the film surface is oriented in a (001) plane. In the crystallization process of the ferromagnet 33, the nonmagnet 34 serves as a seed or a core for growing a crystalline film from the interface with respect to the ferromagnet 33. The nonmagnet 34 arranged between the ferromagnet 33 and the ferromagnet 35 forms a magnetic tunnel junction together with these two ferromagnets.

The ferromagnet 35 displays ferromagnetism. The direction of the easy axis of magnetization of the ferromagnet 35 is perpendicular to the film surface. The ferromagnet 35 therefore has a magnetization direction along the Z-axis, toward either the bit line BL side or the word line WL side. The ferromagnet 35 contains, for example, at least one of iron (Fe), cobalt (Co) and nickel (Ni), and may further contain boron (B). In particular, the ferromagnet 35 may contain iron cobalt boron (FeCoB) or iron boride (FeB), with a body-centered cubic lattice structure. The ferromagnet 35 has a fixed magnetization direction. In the example of FIG. 7, this magnetization direction is oriented toward the bit line BL side along the Z-axis. "Fixed magnetization direction" indicates that the magnetization direction will not change even with a current large enough to reverse the magnetization direction of the ferromagnet 33.

The ferromagnet 35 may be a layer-stacked structure including a plurality of layers, although they are not shown in FIG. 7. In particular, the layer-stacked structure of the ferromagnet 35 may be such that the aforementioned layer containing iron cobalt boron (FeCoB) or iron boride (FeB) is included as an interface layer facing the nonmagnet 34, and a ferromagnet is deposited with a non-magnetic conductor interposed between the interface layer and the nonmagnet 36. The non-magnetic conductor in the ferromagnet 35 may contain at least one metal selected from tantalum (Ta), hafnium (Hf), tungsten (W), zirconium (Zr), molybdenum (Mo), niobium (Nb) and titanium (Ti). The ferromagnet in the layer-stacked structure of the ferromagnet 35 may include at least one multi-layer film selected from a multi-layer film (Co/Pt multi-layer film) containing cobalt (Co) and platinum (Pt), a multi-layer film (Co/Ni multi-layer film) containing cobalt (Co) and nickel (Ni), and a multi-layer film (Co/Pd multi-layer film) containing cobalt (Co) and palladium (Pd).

The nonmagnet 36 is a non-magnetic conductor, which contains, for example, at least one element selected from ruthenium (Ru), osmium (Os), iridium (Ir), vanadium (V), and chromium (Cr).

The ferromagnet 37 displays ferromagnetism. The direction of the easy axis of magnetization of the ferromagnet 37 is perpendicular to the film surface. The ferromagnet 37 has a magnetization direction along the Z-axis, toward either the bit line BL side or the word line WL side. In the same manner as the ferromagnet 35, the magnetization direction of the ferromagnet 37 is fixed, and in the example of FIG. 7, it is oriented toward the word line WL side. The ferromagnet 37 contains at least one alloy selected from cobalt platinum (CoPt), cobalt nickel (CoNi), and cobalt palladium (CoPd). In the same manner as the ferromagnet 35, the ferromagnet 37 may be a layer-stacked structure including a plurality of layers. If this is the case, the ferromagnet 37 may include at least one multi-layer film selected from a multi-layer film (Co/Pt multi-layer film) containing cobalt (Co) and platinum (Pt), a multi-layer film (Co/Ni multi-layer film) containing cobalt (Co) and nickel (Ni), and a multi-layer film (Co/Pd multi-layer film) containing cobalt (Co) and palladium (Pd).

The ferromagnets 35 and 37 are antiferromagnetically coupled to each other by the nonmagnet 36. In other words, the ferromagnets 35 and 37 are coupled in such a manner that their magnetization directions are anti-parallel to each other. In the example of FIG. 7, the magnetization directions of the ferromagnets 35 and 37 are opposing each other. Such a coupled structure of the ferromagnet 35, nonmagnet 36, and ferromagnet 37 is referred to as a synthetic anti-ferromagnetic (SAF) structure. With this structure, the ferromagnet 37 can cancel out the influence of the stray field from the ferromagnet 35 upon the magnetization direction of the ferromagnet 33. The stray field of the ferromagnet 35 and the like tends to cause asymmetric characteristics in a magnetic reversal of the ferromagnetic layer 33. In other words, due to this stray field, the ease of magnetic reversal of the ferromagnetic layer 33 in one direction may significantly differ from the ease of magnetic reversal in the opposite direction. The layer stack 37, however, can suppress such an asymmetry.

The nonmagnet 38 is a non-magnetic conductor which functions as an electrode that enhances the electric connectivity with the bit lines BL and word lines WL. The nonmagnet 38 contains, for example, a metal demonstrating a high melting point. A high melting point metal is a material having a melting point higher than that of iron (Fe) and cobalt (Co), for example. A high melting point metal may contain at least one element selected, for example, from zirconium (Zr), hafnium (Hf), tungsten (W), chromium (Cr), molybdenum (Mo), niobium (Nb), titanium (Ti), tantalum (Ta), vanadium (V), ruthenium (Ru) and platinum (Pt).

According to the present embodiment, a spin injection write system is adopted in which a write current is directly fed into a magnetoresistive effect element MTJ so that a spin torque produced by the current acts on the storage layer SL and reference layer RL, thereby controlling the magnetization directions of the storage layer SL and the reference layer RL. The magnetoresistive effect element MTJ may enter either a low resistance state or a high resistance state, depending on the relationship between the magnetization directions of the storage layer SL and reference layer RL, whether it is parallel or anti-parallel.

When a certain write current Ic0 is fed into the magnetoresistive effect element MTJ in the direction of arrow A1 in FIG. 7, or in other words a direction from the storage layer SL toward the reference layer RL, the magnetization directions of the storage layer SL and reference layer RL demonstrate a parallel relationship. In the parallel state, the resistance of the magnetoresistive effect element MTJ is lowered, setting the magnetoresistive effect element MTJ to the low resistance state. The low resistance state is referred to as "parallel (P) state", in which the data state is defined as "0".

On the other hand, when a write current Ic1 greater than the write current Ic0 is fed into the magnetoresistive effect element MTJ in the direction of arrow A2 in FIG. 7, or in other words in a direction from the reference layer RL to the storage layer SL (direction opposite to arrow A1 along the Z direction), the magnetization directions of the storage layer SL and reference layer RL demonstrate an anti-parallel relationship. In the anti-parallel state, the resistance of the magnetoresistive effect element MTJ increases, which sets the magnetoresistive effect element MTJ to the high resistance state. This high resistance state is referred to as an "anti-parallel (AP) state", in which the data state is defined as "1", for example.

The following explanation is given in accordance with the above method of defining the data. However, the definition of data "1" and data "0" is not limited to the above. For instance, the P state may be defined as data "1", and the AP state may be defined as data "0".

1.2 Method for Manufacturing Memory Cell Array

The method for manufacturing the memory cell array of the magnetic memory device according to the present embodiment will be explained. The details of the layer-stacked structures of the magnetoresistive effect element MTJ and switching element SEL will be omitted from the explanation.

Figure 8:
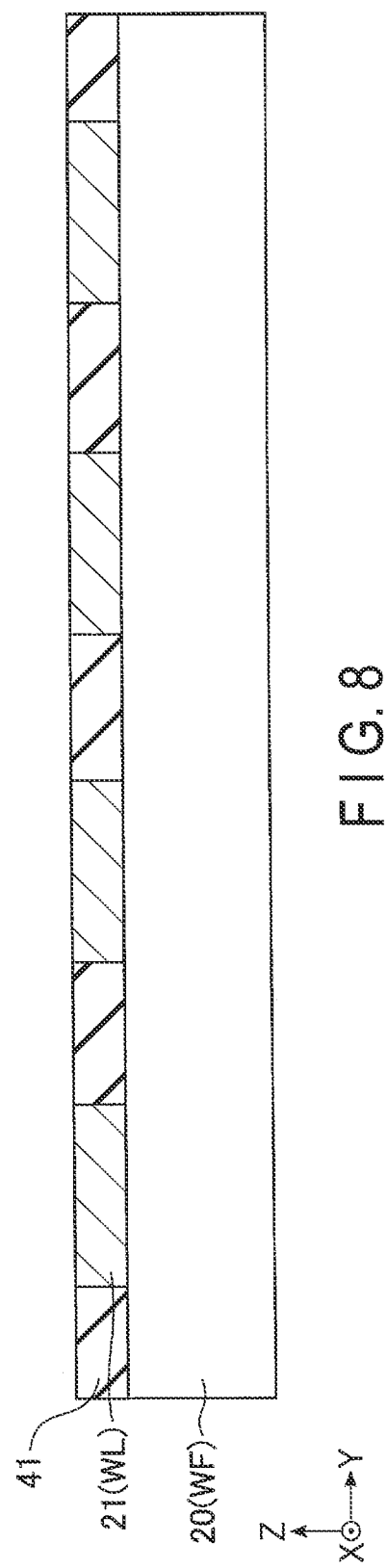
FIG. 8 is a cross-sectional view explaining the method for manufacturing the memory cell array of the magnetic memory device according to the embodiment.
Figure 9:
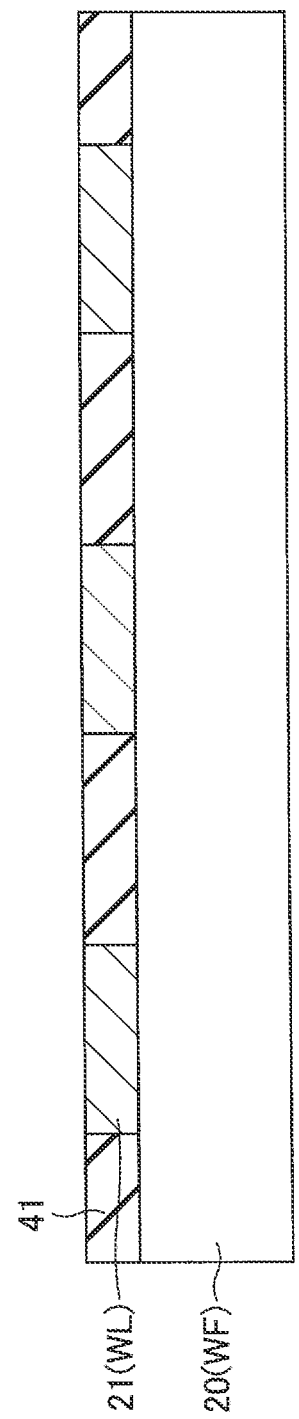
FIG. 9 is a cross-sectional view explaining the method for manufacturing the memory cell array of the magnetic memory device according to the embodiment.
Figure 10:
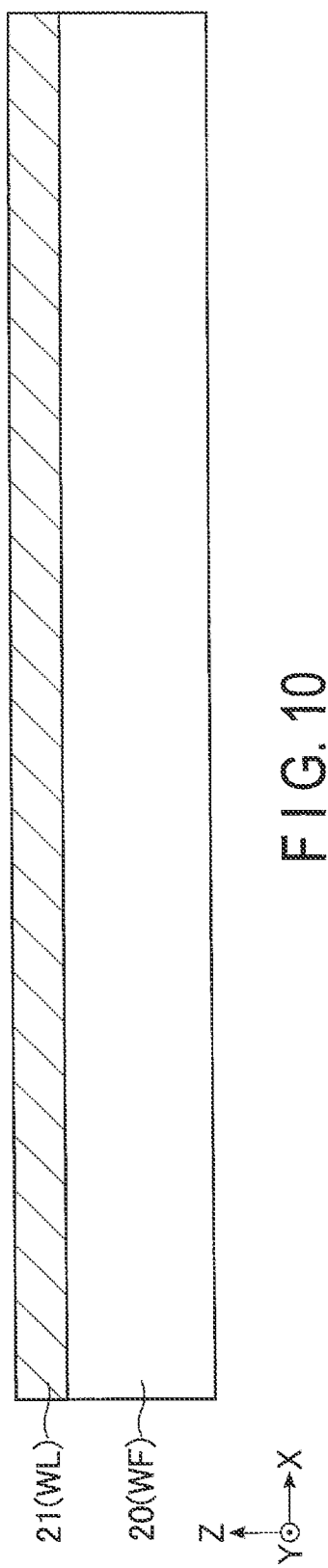
FIG. 10 is a cross-sectional view explaining the method for manufacturing the memory cell array of the magnetic memory device according to the embodiment.
Figure 15:
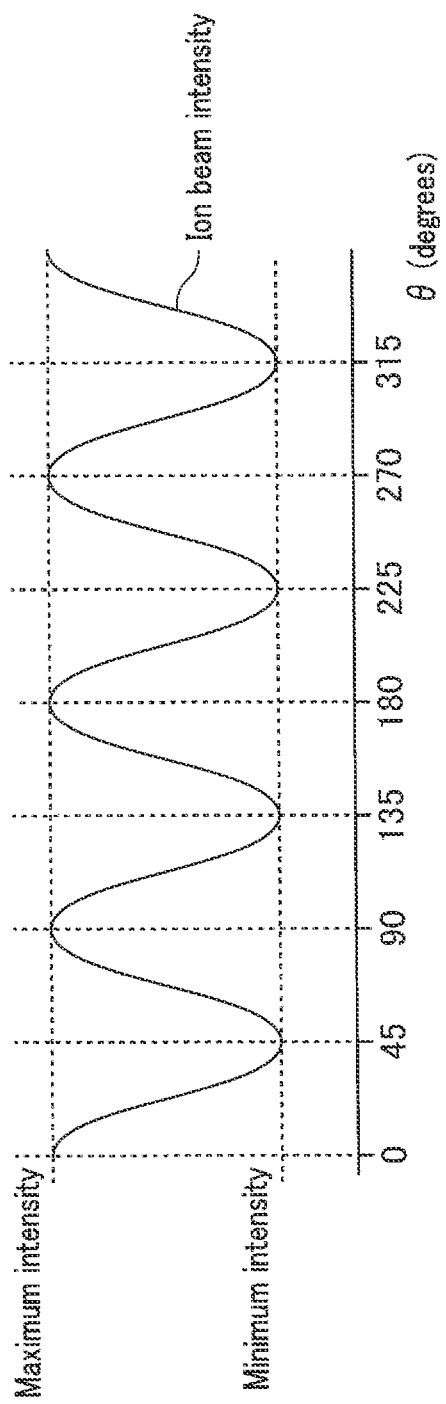
FIG. 15 is a diagram showing the emission intensity of an ion beam in the method for manufacturing the memory cell array of the magnetic memory device according to the embodiment.
Figure 18:
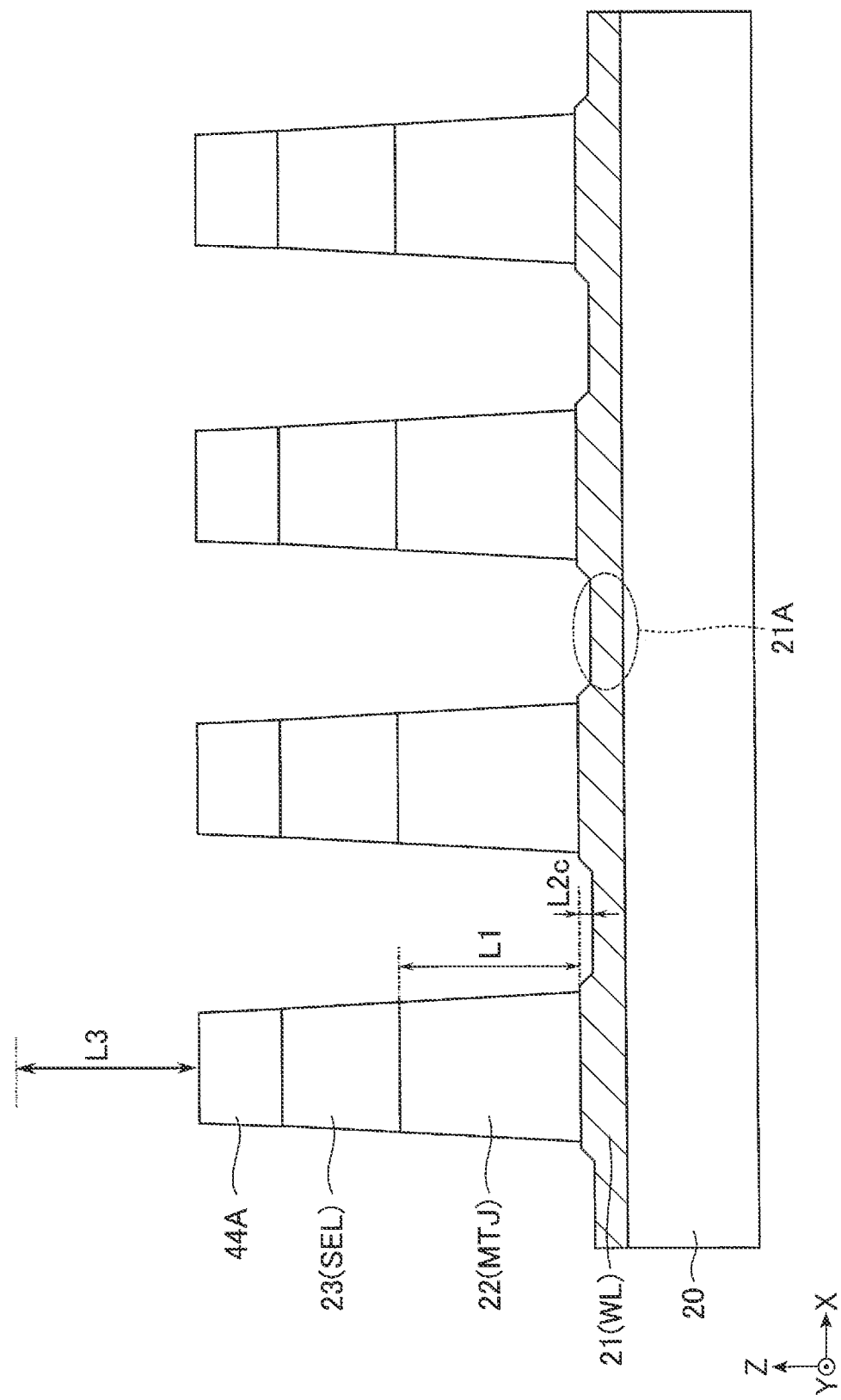
FIG. 18 is a cross-sectional view explaining the method for manufacturing the memory cell array of the magnetic memory device according to the embodiment.

FIGS. 8 to 11, 13, and 16 to 20 show cross-sectional views for explaining the method for manufacturing the memory cell array of the magnetic memory device according to the present embodiment. Of these drawings, the cross sections in FIGS. 8, 11, 13, 16, 19, and 20 correspond to the structure of FIG. 4. FIGS. 9 and 17 show the same processing steps as FIGS. 8 and 16, respectively, and the cross sections in FIGS. 9 and 17 correspond to the structure of FIG. 5. FIG. 10 shows the same processing step as FIGS. 8 and 9, while FIG. 18 shows the same processing step as FIGS. 16 and 17. The cross sections in FIGS. 10 and 18 correspond to the structure of FIG. 6. FIG. 12 is a plan view of the memory cell array 10 when viewed from above, and shows the same processing step as FIG. 11. FIGS. 14 and 15 show the same processing step as FIG. 13. In FIG. 14, the step of forming magnetoresistive effect elements MTJ and switching elements SEL by etching with ion beams is schematically illustrated. FIG. 15 is a diagram explaining the emission intensity of ion beams at ion beam etching.

As illustrated in FIGS. 8 to 10, a plurality of conductors 21 are provided on the top surface of the semiconductor substrate 20, which serves as a wafer WF. In particular, after a conductive layer is provided on the top surface of the semiconductor substrate 20, a mask having an opening in a region other than regions corresponding to the word lines WL is formed through photolithography or the like. Through anisotropic etching using the formed mask, the conductive layer is sectioned into a plurality of conductors 21, and holes that reach the semiconductor substrate 20 are formed. The anisotropic etching adopted in this process is reactive ion etching (RIE), for example. Thereafter, the insulator 41 is provided in the holes.

Figure 11:
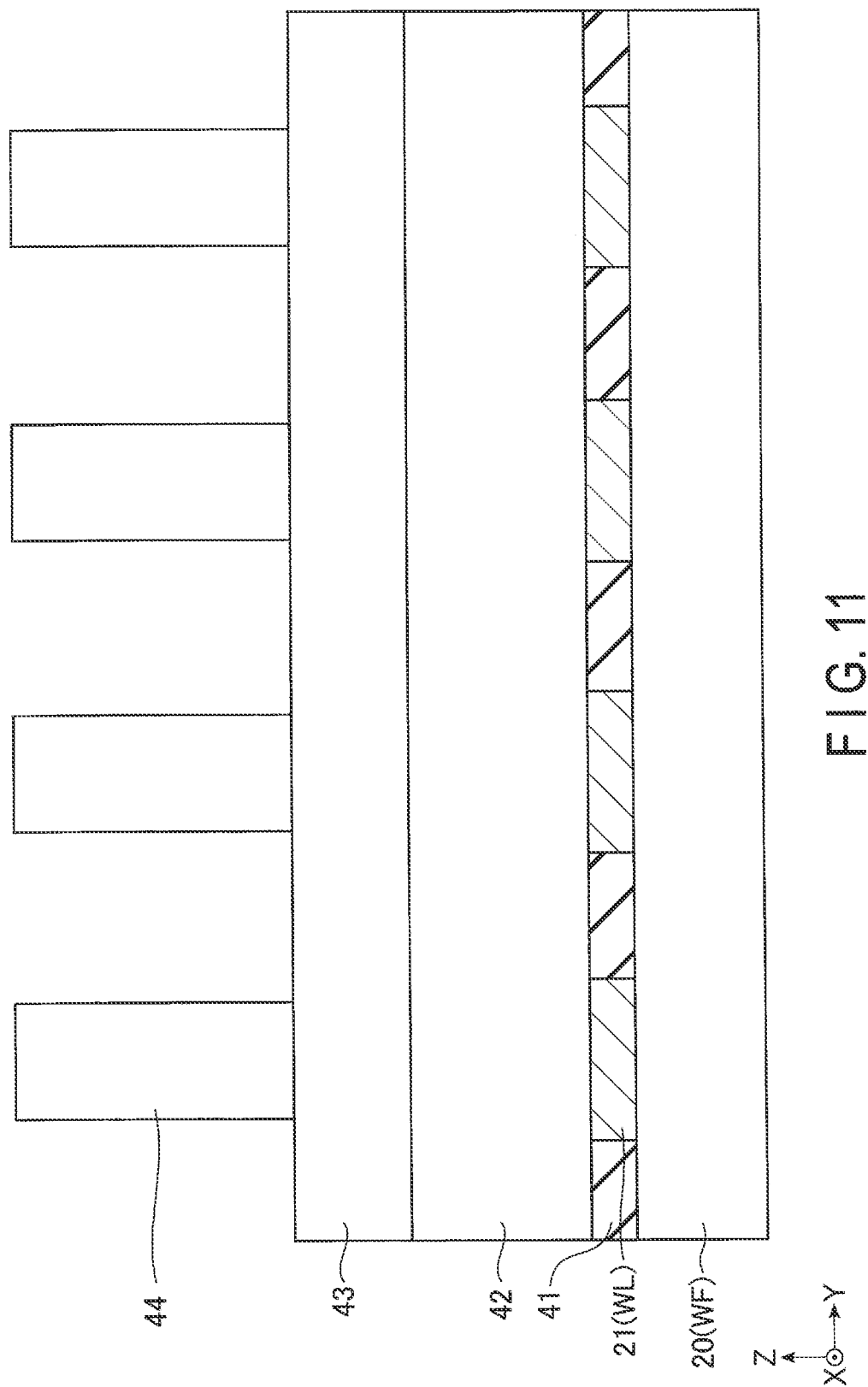
FIG. 11 is a cross-sectional view explaining the method for manufacturing the memory cell array of the magnetic memory device according to the embodiment.

Next, as illustrated in FIGS. 11 and 12, a magnetoresistive effect element layer 42, a selector layer 43, and masks 44 are formed in this order on the top surfaces of the conductors 21 and insulators 41.

In particular, first, the magnetoresistive effect element layer 42 is deposited on the top surfaces of the conductors 21 and insulators 41. The magnetoresistive effect element layer 42 is a layer stack in which the layers of the magnetoresistive effect element MTJ are deposited in the stacking order in a planar fashion, as explained with reference to FIG. 7.

Thereafter, the selector layer 43 is deposited on the top surface of the magnetoresistive effect element layer 42. The selector layer 43 is a layer stack in which one or more layer structures configured to function as a switching element SEL are deposited in a certain stacking order in a planar fashion.

Then, masks 44 are formed on the top surface of the selector layer 43 through photolithography or the like. With these masks 44 on, portions of the magnetoresistive effect element layer 42 and selector layer 43 that do not correspond to the magnetoresistive effect elements MTJ and switching elements SEL are exposed. The masks 44 contain titanium nitride (TiN), for example, and protect the portions that are for functioning magnetoresistive effect elements MTJ and switching elements SEL during ion beam etching, which will be described later. The masks 44 are formed in columnar structures aligned in a matrix on the top surface of the selector layer 43, each of the columnar structures protecting the region corresponding to one memory cell MC. The diameter of the columnar structure is larger than, for example, the length d3 of the tunnel barrier layer TB in FIG. 7.

Figure 13:
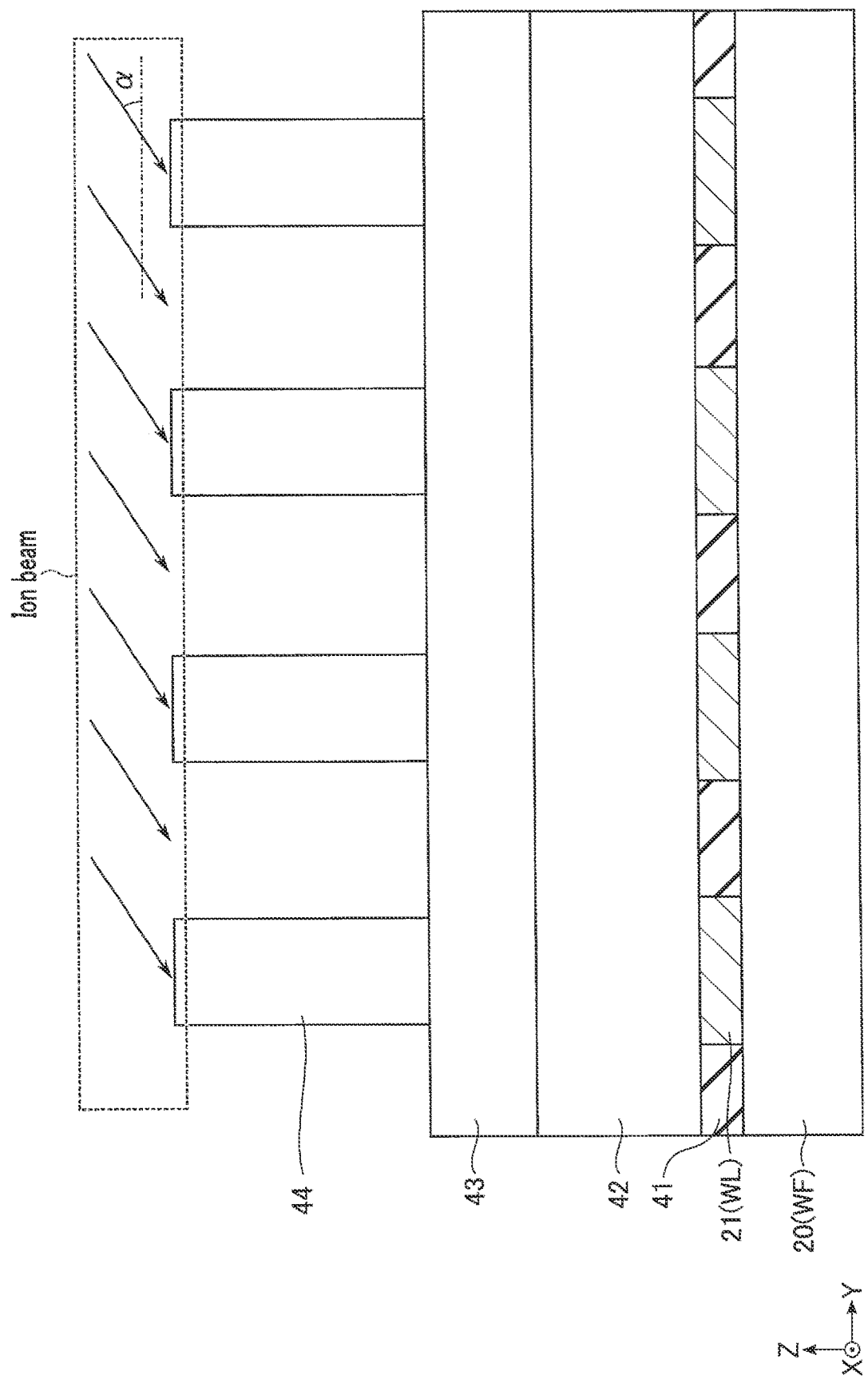
FIG. 13 is a cross-sectional view explaining the method for manufacturing the memory cell array of the magnetic memory device according to the embodiment.

Next, as illustrated in FIGS. 13 and 14, the magnetoresistive effect element layer 42 and selector layer 43 are etched through ion beam etching. As a result, the portions of the magnetoresistive effect element layer 42 and selector layer 43 that are not protected by the masks 44 are removed so that the portions of the conductors 21 and insulator 41 beneath the removed portions are exposed.

For the ion beam etching, the wafer WF that has been subjected to the steps up to FIG. 12 is placed on the not-shown stage of a not-shown ion beam generator. This stage supports the wafer WF in a rotatable manner around the Z-axis. The ion beam generator emits an ion beam toward the wafer WF on the stage ST at an incident angle $\alpha$, as illustrated in FIG. 13. The incident angle $\alpha$ is defined as an angle between the surface of the wafer WF and the ion beam. The incident angle $\alpha$ is larger than 0 degrees and smaller than 90 degrees ($0°<\alpha<90°$). The stage spins the wafer WF around the Z-axis at a certain angular velocity. As illustrated in FIG. 14, the azimuth angle $\theta$ varies as the axis A rotates around the Z-axis in accordance with the spinning of the wafer WF. The azimuth angle $\theta$ is defined as an angle between an axis A (e.g., X-axis or Y-axis) on the surface of the wafer WF and the projection of an ion beam upon the surface of the wafer WF. In FIG. 14, the direction in which the masks 44 are aligned with the shortest distance apart from one another (i.e., the extending direction of each conductor 21 or the aligning direction of the conductors 21) is determined as an axis A on the surface of the wafer WF.

During the ion beam etching, the ion beam generator continuously changes the emission intensity of the ion beam in accordance with the azimuth angle $\theta$, as indicated in FIG. 15. In the example of FIG. 15, the emission intensity of the ion beam with the azimuth angle $\theta$ changing from 0 degrees to 360 degrees is indicated. The ion beam generator changes the emission intensity of the ion beam from the minimum intensity to the maximum intensity and back to the minimum intensity, periodically repeating this change every time the azimuth angle $\theta$ changes 45 degrees, where the intensity at the azimuth angle $\theta$ of 0 degrees is determined as the maximum intensity. As a result, when the azimuth angle $\theta$ is at 0, 90, 180, and 270 degrees, the emission intensity of the ion beam reaches the maximum. On the other hand, when the azimuth angle $\theta$ is at 45, 135, 225, and 315 degrees, the emission intensity of the ion beam reaches the minimum. This means that the ion beam generator continuously changes the emission intensity of the ion beam at a frequency four times larger than the frequency of the spinning of the wafer WF.

As a result of the above ion beam etching, the masks 44 and portions unprotected by the masks 44 (i.e., portions of the selector layer 43 and magnetoresistive effect element layer 42 that are to be removed) are etched off. According to this ion beam etching, the etching rate is uniform across the etching target area, regardless of a position on the etching target area.

In particular, an ion beam generator is configured to emit an ion beam at an incident angle α smaller than 90 degrees (approximately 45 degrees, for example). This means that the area shielded from the ion beam by the masks 44 changes, depending on the azimuth angle θ. That is, even if the emission of the ion beam is maintained at a constant intensity, the etching rate at an etching target area changes depending on the azimuth angle θ, under the influence of shadowing dependent on the azimuth angle θ.

According to the present embodiment, as described with reference to FIG. 15, the ion beam generator controls the emission intensity of the ion beam in such a manner as to continuously change in accordance with the azimuth angle θ. For instance, at an azimuth angle θ at which the influence of shadowing increases, the ion beam generator performs control in a manner such that the emission intensity of the ion beam will increase so as to suppress a reduction in the etching rate. In addition, the ion beam generator performs control in such a manner that, at an azimuth angle θ at which the influence of shadowing is reduced, the emission intensity of the ion beam will be lowered so as to suppress an increase in the etching rate. In this manner, the ion beam generator balances out the influence of shadowing, thereby keeping the etching of the etching target area to a uniform depth.

FIG. 15 shows an example of the ion beam generator, where the ion beam generator changes the emission intensity of the ion beam at a frequency four times larger than the rotation frequency of the wafer WF having a layout of memory cells MC at intersection points of a square mesh as illustrated in FIG. 3. This is not a limitation, however. The ion beam generator can change the emission intensity of the ion beam at any frequency as long as the etching rate across the etching target area is maintained uniform. The influence of shadowing depending on the azimuth angle θ may differ among different layouts of memory cells MC. The ion beam generator therefore can change the emission intensity of the ion beam at a suitable frequency in accordance with the layout of memory cells MC, and this suitable frequency may be other than a quadruple of the rotation frequency of the wafer WF.

At the emission of the ion beam, the stage rotates the wafer WF any suitable number of times until the magnetoresistive effect element layer 42 is sectioned into a plurality of elements 22, in accordance with the angular velocity of the rotation of the wafer WF, the intensity of the ion beam, and the like.

Through the above ion beam etching, a plurality of layer stack structures each including elements 22 and 23 are formed from the magnetoresistive effect element layer 42 and selector layer 43.

Figure 16:
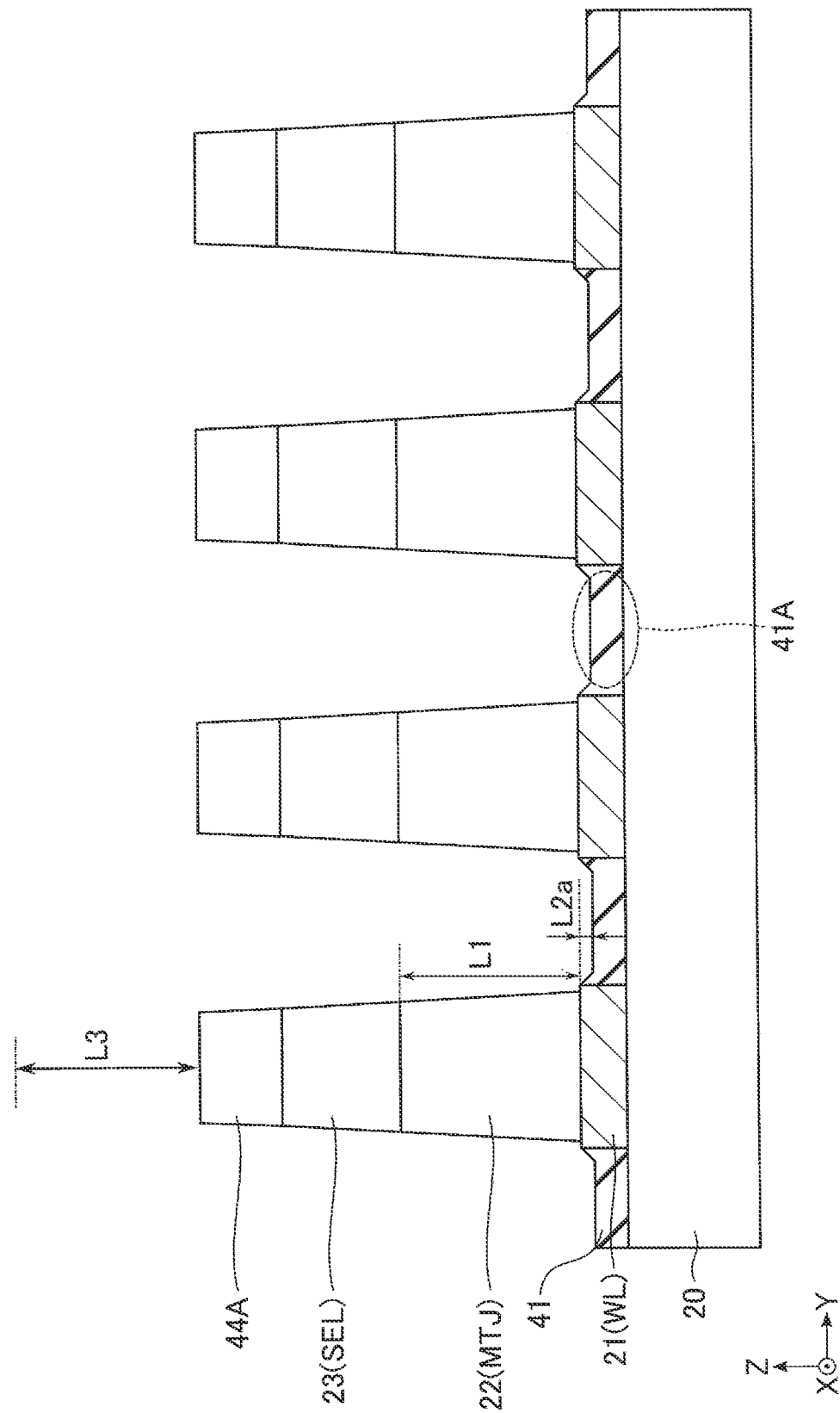
FIG. 16 is a cross-sectional view explaining the method for manufacturing the memory cell array of the magnetic memory device according to the embodiment.

In order to reliably section the magnetoresistive effect element layer 42 into a plurality of elements 22, the conductors 21 and insulator 41 underneath the magnetoresistive effect element layer 42 are partially etched off by the above ion beam etching. As illustrated in FIG. 16, while the masks 44 are being etched with their height reduced by amount L3 to become masks 44A, the selector layer 43, the magnetoresistive effect element layer 42, and the portion 41A of the insulator 41 are etched with their total height reduced by amount (L1+L2a). As illustrated in FIG. 17, while the masks 44 are being etched with their height reduced by amount L3 to become masks 44A, the selector layer 43, the magnetoresistive effect element layer 42, and the portion 41B of the insulator 41 are etched with their total height reduced by amount (L1+L2b). As illustrated in FIG. 18, while the masks 44 are being etched with their height reduced by amount L3 to become masks 44A, the selector layer 43, the magnetoresistive effect element layer 42, and the portion 21A of the conductors 21 are etched with their total height reduced by amount (L1+L2c).

With the aforementioned ion beam etching, (L1+L2a), (L1+L2b), and (L1+L2c) become approximately the same amount. Specifically, the aforementioned ratio of height (L1+L2a) to the reference height Lref can be determined to be 0.9 or larger and 1.1 or smaller (0.9≤(L1+L2a)/Lref≤1.1). The ratio of height (L1+L2b) to the reference height Lref can be determined to be 0.9 or larger and 1.1 or smaller (0.9≤(L1+L2b)/Lref≤1.1). The ratio of height (L1+L2c) to the reference height Lref can be determined to be 0.9 or larger and 1.1 or smaller (0.9≤(L1+L2c)/Lref≤1.1).

The masks 44A and the elements 22 and 23 underneath the masks 44A are approximately circular (substantially isotropically etched on the XY plane) when viewed from above, although they are not shown, through the ion beam etching with which the aforementioned intensity of the ion beam is continuously changed in accordance with the azimuth angle θ.

Figure 19:
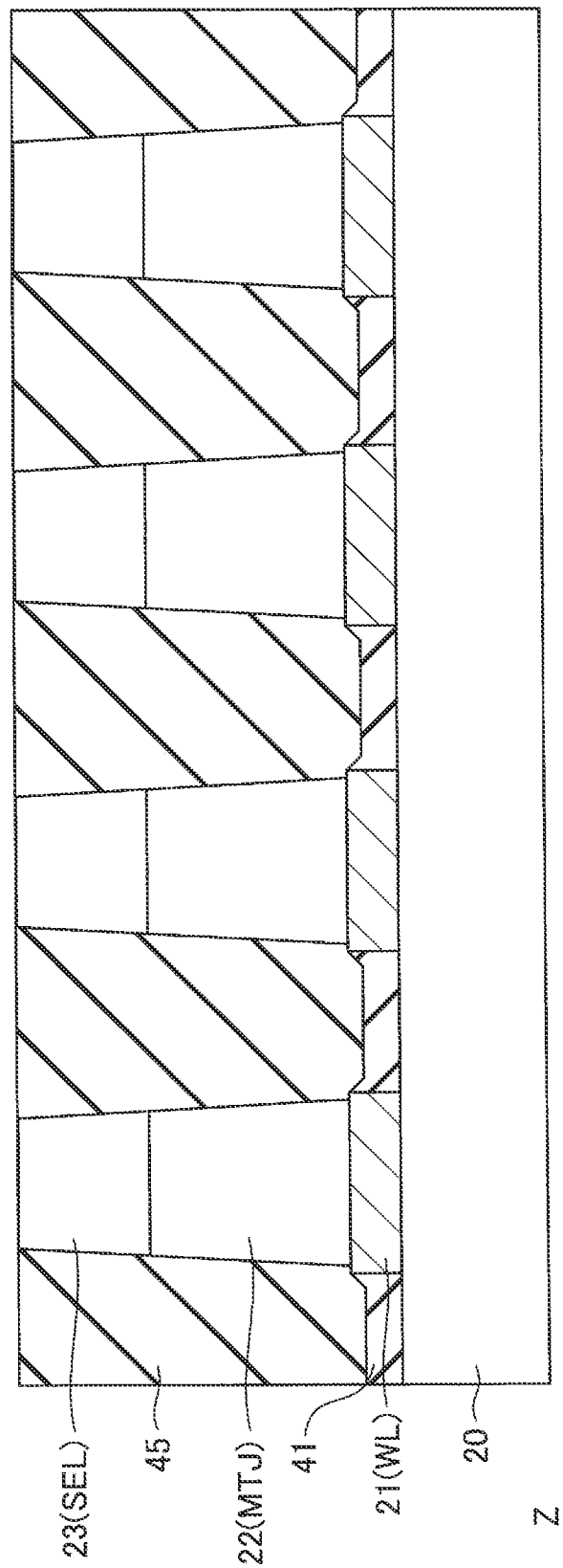
FIG. 19 is a cross-sectional view explaining the method for manufacturing the memory cell array of the magnetic memory device according to the embodiment.

Next, as illustrated in FIG. 19, after the removal of the masks 44A, the space created by etching of the magnetoresistive effect element layer 42 and selector layer 43 with the ion beam is filled in with an insulator 45.

Thereafter, as illustrated in FIG. 20, a plurality of conductors 24 are provided on the top surfaces of the elements 23 and insulator 45 so as to be aligned in the X-axis. In particular, a conductive layer is first deposited on the top surfaces of the elements 23 and insulator 45, and a mask is formed through photolithography or the like to have an opening in a region excluding the regions corresponding to the bit lines BL. The anisotropic etching, with this mask, sections the conductive layer into a plurality of conductors 21, and holes are formed to reach the insulator 45. The RIE may be adopted for anisotropic etching of this process. Thereafter, an insulator, which is not illustrated, is provided in the holes.

In the above manner, a structure corresponding to the memory cell array 10 is formed on the wafer WF. Finally, the wafer WF is diced into chips each serving as the magnetic memory device 1.

1.3 Effects of Present Embodiment

According to the present embodiment, in the process of ion beam etching, the ion beam generator spins a wafer WF around the Z-axis. The azimuth angle θ determined by the wafer WF and ion beam therefore continuously changes. That is, the ion beam generator isotropically emits ion beams to the wafer WF, independently from the azimuth angle θ. Thus, unlike in an ion beam generator configured to emit an ion beam to the wafer WF while discretely changing the azimuth angle θ, magnetoresistive effect elements MTJ can be formed to have a circular cross section. In comparison with a magnetoresistive effect element MTJ having a rectangular XY cross section, the shape of the circular XY cross section is more symmetrical with respect to the central axis. Such a shape can avoid a concentration of the electric field at a certain point of the XY cross section (e.g., around the corners of a rectangular section), thereby suppressing the deterioration of the magnetoresistive effect element MTJ.

In addition, during the ion beam etching, the ion beam generator continuously changes the emission intensity of the ion beam in accordance with the azimuth angle θ. As discussed earlier, the influence of shadowing changes depending on the azimuth angle θ. In a layout of memory cells MC at intersection points of a square mesh as illustrated in FIG. 3, the influence of shadowing increases when the azimuth angle θ is 0, 90, 180, and 270 degrees. When the azimuth angle θ is 45, 135, 225, and 315 degrees, the influence of shadowing is reduced. The ion beam generator continuously changes the emission intensity of the ion beam at a frequency four times larger than the frequency of the rotation of the wafer. The influence of shadowing based on the geometrical relationship between the etching target area of the magnetoresistive effect element layer 42 and the masks 44 during the ion beam etching can be reduced. Thus, during the ion beam etching, the etching depth of the conductors 21 and insulator 41 can be kept uniform across the etching target area.

Specifically, the etching rate changes depending on the positional relationship between the arrangement of the masks 44 and the incident direction of the ion beam (i.e., azimuth angle θ). In particular, when an ion beam is emitted from the direction along the X-axis, the etching rate tends to decrease in the etching target area more in a region between two adjacent masks 44 aligned in the X-axis among the matrix of masks 44 than in a region between two diagonally adjacent masks 44 and a region between two adjacent masks 44 aligned in the Y-axis. Similarly, when an ion beam is emitted from the direction along the Y-axis, the etching rate tends to decrease in the etching target area more in the region between two adjacent masks 44 aligned in the Y-axis among the matrix of masks 44 than in the region between two diagonally adjacent masks 44 and the region between two adjacent masks 44 aligned in the X-axis. In contrast, when the projection of the ion beam to the wafer WF intersects both the X-axis and Y-axis, the etching rate is enhanced in the etching target area between two adjacent masks 44 aligned in the X-axis or Y-axis, in comparison to the above two exemplary emissions. In light of the above, during the ion beam etching, when maintaining the emission of the ion beam at a constant intensity independently from the azimuth angle θ while spinning the wafer WF, the etching rate tends to decrease, due to the influence of shadowing, more in the area between two adjacent masks 44 aligned in the X-axis and Y-axis than in the area between two diagonally adjacent masks 44.

According to the present embodiment, the emission of the ion beam to the wafer WF is set so as to demonstrate the maximum intensity at azimuth angle θ (=0, 90, 180, and 270 degrees) at which the etching rate decreases in the area between two adjacent masks 44 aligned in the X-axis or Y-axis direction. As a result, the decrease in the etching rate can be suppressed in the etching target area between two adjacent masks 44 aligned in the X-axis and Y-axis directions. This can smoothen the variation in the etching rate across the etching target area, in comparison with the case where the intensity of the ion beam does not depend on the azimuth angle θ. Thus, even in a dense arrangement of magnetoresistive effect elements MTJ with an aspect ratio AR larger than the range of 1 to 1.5, a memory cell array 10 that satisfies the length d1 of 50 nm or smaller and the length d3 of 20 nm or smaller can be manufactured.

2. Modification Examples

The above embodiment is not a limitation, and various other modifications may be applied.

In the explanation of the above embodiment, the magnetoresistive effect element layer 42 is formed beneath the selector layer 43. This is not a limitation, however. For instance, the magnetoresistive effect element layer may be formed above the selector layer. In such an arrangement, the selector layer and magnetoresistive effect element layer may be etched by ion beam etching, or only the magnetoresistive effect element layer may be etched by ion beam etching.

Figure 21:
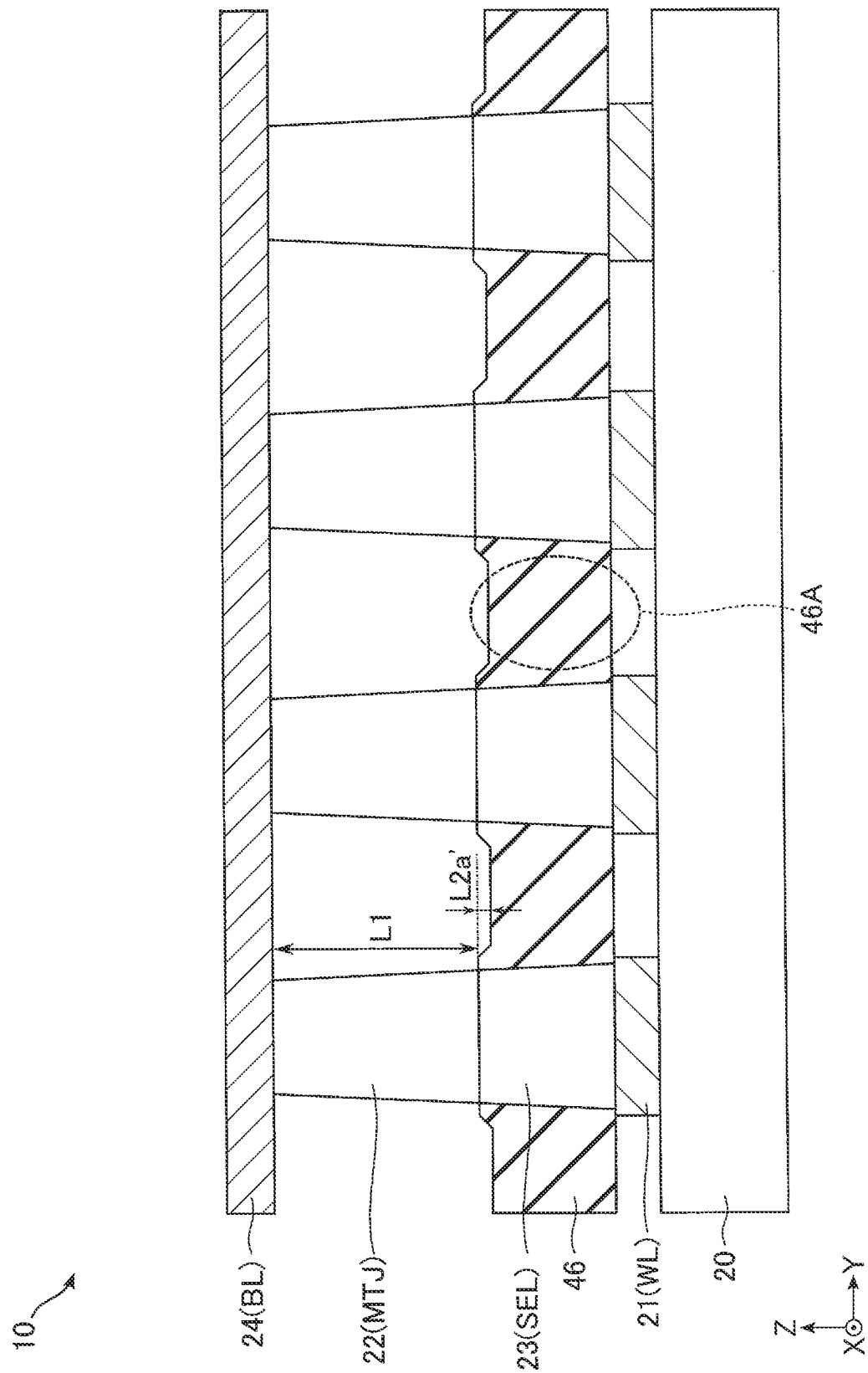
FIG. 21 is a cross-sectional view showing a configuration of a memory cell array in a magnetic memory device according to a modification example.
Figure 22:
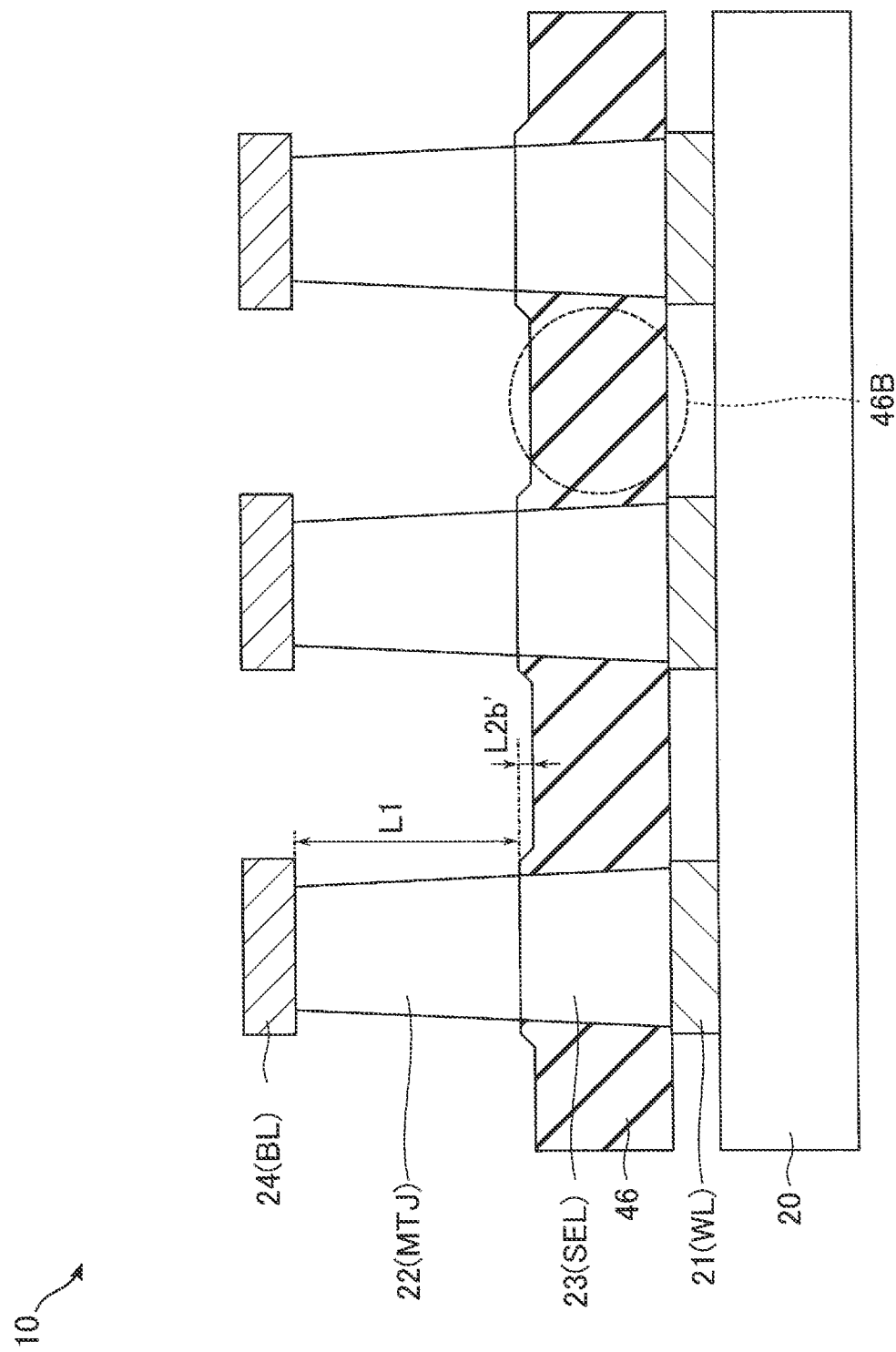
FIG. 22 is a cross-sectional view showing the configuration of the memory cell array in the magnetic memory device according to the modification example.
Figure 23:
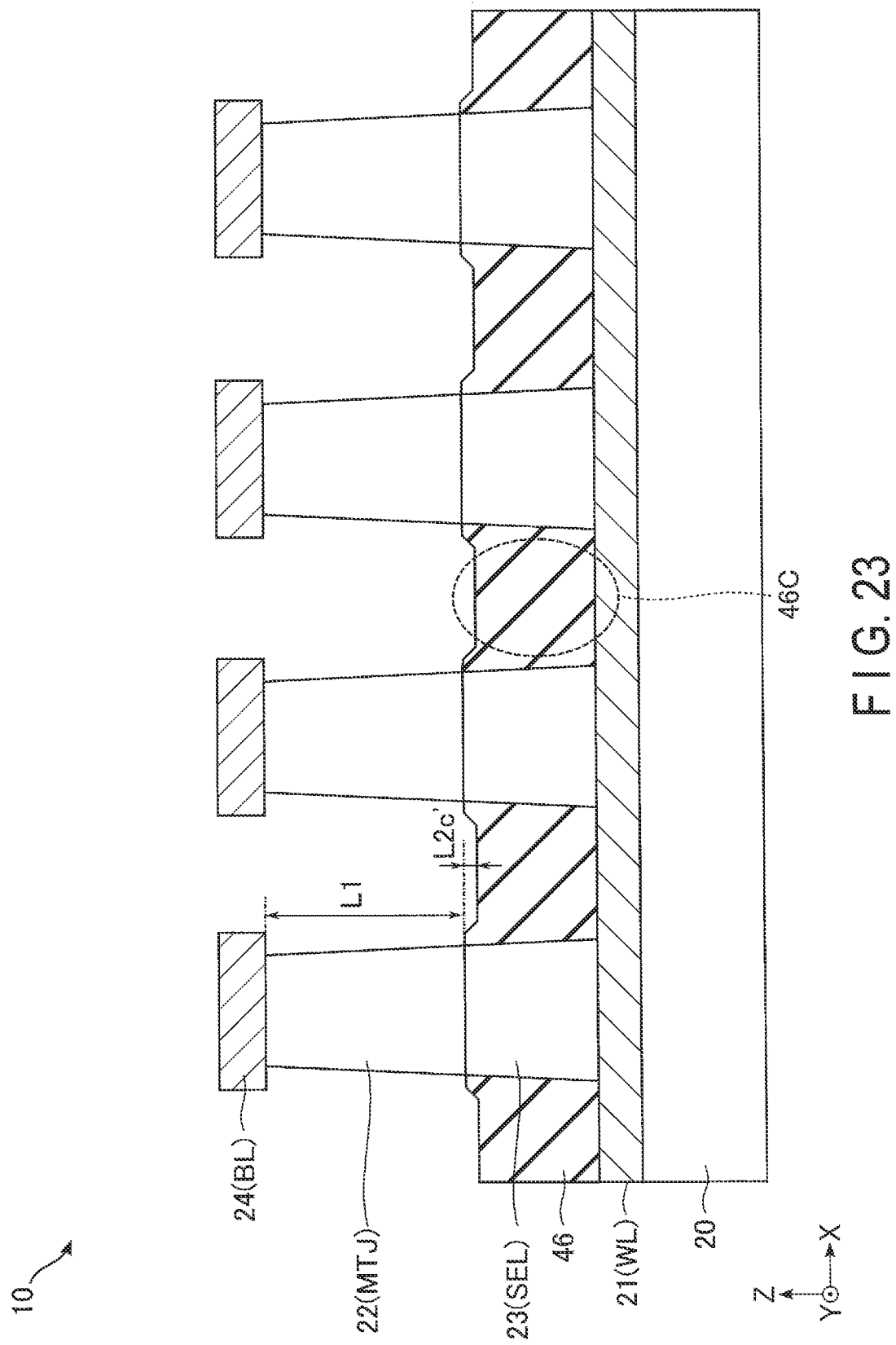
FIG. 23 is a cross-sectional view showing the configuration of the memory cell array in a magnetic memory device according to the modification example.

FIGS. 21, 22, and 23 show cross-sectional views of an exemplary configuration of a memory cell array in a magnetic memory device according to a modification example. FIGS. 20, 22, and 23 correspond to FIGS. 4, 5, and 6, respectively, of the embodiment, showing a memory cell array 10A in which the magnetoresistive effect element layer 42 is provided above the selector layer 43.

As illustrated in FIGS. 21, 22, and 23, the memory cell array 10A is provided above the semiconductor substrate 20.

A plurality of conductors 21 are arranged on the top surface of the semiconductor substrate 20. The conductors 21 are conductive, and function as respective word lines WL.

A plurality of elements 23, each of which functions as a switching element SEL, are arranged on the top surface of a conductor 21. An element 23 is tapered with its XY plane cross-sectional area decreasing in the upward direction. The elements 23 arranged on the top surface of the conductor 21 may be aligned, for example in the direction of the X-axis. In other words, the elements 23 aligned in the X-axis direction are commonly coupled to the top surface of the conductor 21. An insulator 46 is provided between any two adjacent elements 23. In this manner, the elements 23 are mutually insulated.

The top surface of the portion 46A of the insulators 46 between two adjacent elements 22 in the cross section of FIG. 21 is positioned lower by amount L2a' than the bottom surface of the elements 22. The height of the top surface of the portion 46A scarcely changes, irrespective of the distance from the elements 22.

Furthermore, the top surface of a portion 46B of the insulator 46 between two adjacent elements 23 in the cross section of FIG. 22 is positioned lower by amount L2b' than the bottom surface of the elements 22. In the same manner as the top surface of the portion 46A, the height of the top surface of the portion 46B scarcely changes, irrespective of the distance from the elements 22.

Furthermore, the top surface of a portion 46C of the insulator 46 between two adjacent elements 23 in the cross section of FIG. 23 is positioned lower by amount L2c' than the bottom surface of the elements 22. In the same manner as the top surfaces of the portions 46A and 46B, the height of the top surface of the portion 46C scarcely changes irrespective of the distance from the elements 22.

An element 22 is arranged on the top surface of each of the elements 23 to serve as a magnetoresistive effect element MTJ. The element 22 has a height L1 along the Z-axis, and is tapered with its XY plane cross-sectional area decreasing in the upward direction, in the same manner as the elements 23. The top surface of the elements 22 is coupled to one of the conductors 24.

The conductors 24 are conductive and function as bit lines BL. A plurality of elements 22 aligned in the Y-axis are commonly coupled to one conductor 24.

In the above configuration of the memory cell array 10A, the lengths L2a', L2b', and L2c' can be regarded as approximately equal to each other. In other words, the top surfaces of the portion 46A, the portion 46B, and the portion 46C of the insulator 46 can be regarded to be approximately at the same height. In particular, the ratio of the height (L1+L2a') to the predefined reference height Lref' is, for example, 0.9 or larger and 1.1 or smaller ($0.9 \leq (L1+L2a')/Lref' \leq 1.1$). The ratio of the height ($L1+L2b'$) to the reference height Lref' is 0.9 or larger and 1.1 or smaller ($0.9 \leq (L1+L2b')/Lref' \leq 1.1$). The ratio of the height ($L1+L2c'$) to the reference height Lref' is 0.9 or larger and 1.1 or smaller ($0.9 \leq (L1+L2c')/Lref' \leq 1.1$). The reference height Lref' may be the average height ($L1+(L2a'+L2b'+L2c')/3$) of the heights ($L1+L2a'$), ($L1+L2b'$), and ($L1+L2c'$). This is not a limitation, however. The reference height Lref' may be the average of the heights between the top surface of the elements 22 and the top surfaces of four or more portions selected from the portions 46A, 46B, and 46C in such a manner as to include at least one of the portions 46A, at least one of the portions 46B, and at least one of the portions 46C.

In the above configuration, the distance between the masks 44 and the elements 22 can be shortened. This can reduce the influence of shadowing during the ion beam etching.

In the explanation of the above embodiment, the magnetoresistive effect element layer 42 and selector layer 43 are simultaneously ion-beam etched. This is not a limitation, however. For instance, the selector layer 43 may be first etched through RIE or the like, and then only the magnetoresistive effect element layer 42 may be subjected to the ion beam etching.

In the embodiment, a top-free magnetoresistive effect element MTJ in which the storage layer SL is arranged above the reference layer RL has been described, but this is not a limitation. For instance, the magnetoresistive effect element MTJ may be of a bottom-free type in which the storage layer SL is arranged underneath the reference layer RL.

Furthermore, in the above embodiment, a memory cell array 10 in which all the memory cells MC are arranged at the same layer level has been described, but this is not a limitation. For instance, the memory cell array 10 may include word lines WLd underneath the bit lines BL and word lines WLu above the bit lines BL, and may also include a plurality of memory cells MCd between the word lines WLd and bit lines BL and a plurality of memory cells MCu between the word lines WLu and bit lines BL. The number of memory cells MC stacked along the Z-axis is not limited to two, and the configuration can be designed such that any desired number of memory cells MC can be stacked.

The embodiments of the present invention have been explained. These are presented merely as examples and are not intended to restrict the scope of the invention. These embodiments may be realized in various other forms, and various omissions, replacements, and changes can be made without departing from the gist of the invention. Such embodiments and modifications are included in the scope and gist of the invention, and are included in the scope of the invention described in the claims and its equivalents.

The invention claimed is:

1. A magnetic memory device comprising:
   a first conductor and a second conductor each extending in a first direction and being separated from each other and aligned in a second direction that intersects the first direction;
   a third conductor and a fourth conductor each extending in the second direction, the third conductor and the fourth conductor being arranged above the first conductor and the second conductor and being separated from each other and aligned in the first direction;
   a first layer stack arranged between the first conductor and the third conductor, and including a first magnetoresistive effect element;
   a second layer stack arranged between the first conductor and the fourth conductor, and including a second magnetoresistive effect element;
   a third layer stack arranged between the second conductor and the third conductor, and including a third magnetoresistive effect element; and
   an insulator arranged between the first conductor and the second conductor, a position of the insulator in a third direction that intersects both the first direction and the second direction being lower than positions of the first layer stack, the second layer stack, and the third layer stack in the third direction,
   wherein:
   a shape of the first layer stack is circular when viewed along the third direction,
   a shape of the second layer stack is circular when viewed along the third direction,
   a shape of the third layer stack is circular when viewed along the third direction,
   a top surface of the first layer stack, a top surface of the second layer stack, and a top surface of the third layer stack are on a same first plane extending along the first direction and the second direction,
   the insulator includes a first portion between the first layer stack and the third layer stack, and a second portion between the second layer stack and the third layer stack,
   the first conductor includes a third portion between the first layer stack and the second layer stack,
   a first distance from a top surface of the first portion to the first plane, a second distance from a top surface of the second portion to the first plane, and a third distance from a top surface of the third portion to the first plane are substantially equal, and
   a height of a top surface of a first portion of the first conductor that overlaps with the first layer stack along the third direction is greater than a height of the top surface of the third portion, and
   a height of a top surface of a second portion of the first conductor that overlaps with the second layer stack along the third direction is greater than the height of the top surface of the third portion.

2. The device of claim 1, wherein a distance between the first layer stack and the second layer stack is 50 nanometers or smaller.

3. The device of claim 2, wherein:
   the first magnetoresistive effect element includes a first ferromagnetic layer, a second ferromagnetic layer, and a non-magnetic layer between the first ferromagnetic layer and the second ferromagnetic layer, and
   an outer diameter of the circular shape in the non-magnetic layer is 20 nanometers or smaller.

4. The device of claim 3, wherein the non-magnetic layer includes a magnesium (Mg) oxide.

5. The device of claim 4, wherein the first ferromagnetic layer and the second ferromagnetic layer include at least one element selected from iron (Fe), cobalt (Co), and nickel (Ni).

6. The device of claim 5, wherein the first ferromagnetic layer takes a first resistance value in accordance with a first current flowing from the first ferromagnetic layer to the second ferromagnetic layer, and takes a second resistance value in accordance with a second current flowing from the second ferromagnetic layer to the first ferromagnetic layer.

7. The device of claim 6, wherein the first resistance value is smaller than the second resistance value.

8. The device of claim 1, wherein the first layer stack further includes a switching element serially connected to the first magnetoresistive effect element.

9. The device of claim 1, wherein:
- a position of the top surface of each of the first and second portions along the third direction is below a position of an uppermost surface of the insulator along the third direction, and
- a position of the top surface of the third portion along the third direction is below a position of an uppermost surface of the first conductor along the third direction.

10. A magnetic memory device comprising:
- a first conductor and a second conductor each extending in a first direction and being separated from each other and aligned in a second direction that intersects the first direction;
- a third conductor and a fourth conductor each extending in the second direction, the third conductor and the fourth conductor being arranged above the first conductor and the second conductor and being separated from each other and aligned in the first direction;
- a first layer stack arranged between the first conductor and the third conductor, and including a first magnetoresistive effect element;
- a second layer stack arranged between the first conductor and the fourth conductor, and including a second magnetoresistive effect element;
- a third layer stack arranged between the second conductor and the third conductor, and including a third magnetoresistive effect element; and
- an insulator arranged between the first conductor and the second conductor, a position of the insulator in a third direction that intersects both the first direction and the second direction being lower than positions of the first layer stack, the second layer stack, and the third layer stack in the third direction, wherein:
- a shape of the first layer stack is circular when viewed along the third direction,
- a shape of the second layer stack is circular when viewed along the third direction,
- a shape of the third layer stack is circular when viewed along the third direction,
- a top surface of the first layer stack, a top surface of the second layer stack, and a top surface of the third layer stack are on a same first plane extending along the first direction and the second direction,
- the insulator includes a first portion between the first layer stack and the third layer stack, a second portion between the second layer stack and the third layer stack, and a third portion between the first layer stack and the second layer stack and above the first conductor, and
- a first distance from a top surface of the first portion to the first plane, a second distance from a top surface of the second portion to the first plane, and a third distance from a top surface of the third portion to the first plane are substantially equal.

11. A magnetic memory device comprising:
- a first conductor and a second conductor each extending in a first direction and being separated from each other and aligned in a second direction that intersects the first direction;
- a third conductor and a fourth conductor each extending in the second direction, the third conductor and the fourth conductor being arranged above the first conductor and the second conductor and being separated from each other and aligned in the first direction;
- a first layer stack arranged between the first conductor and the third conductor, and including a first magnetoresistive effect element;
- a second layer stack arranged between the first conductor and the fourth conductor, and including a second magnetoresistive effect element;
- a third layer stack arranged between the second conductor and the third conductor, and including a third magnetoresistive effect element; and
- an insulator arranged between the first conductor and the second conductor, a position of the insulator in a third direction that intersects both the first direction and the second direction being lower than positions of the first layer stack, the second layer stack, and the third layer stack in the third direction, wherein:
- a shape of the first layer stack is circular when viewed along the third direction,
- a shape of the second layer stack is circular when viewed along the third direction,
- a shape of the third layer stack is circular when viewed along the third direction,
- a height of the insulator in the third direction from a bottom surface to a top surface thereof varies along a length of the insulator in the second direction so as to include at least two different heights,
- a height of the first conductor in the third direction from a bottom surface to a top surface thereof varies along a length of the first conductor in the first direction so as to include at least two different heights, and
- the first conductor has a substantially same thickness along a length of the first conductor in the second direction.

* * * * *